(12) United States Patent
Mizukami

(10) Patent No.: US 6,264,563 B1
(45) Date of Patent: Jul. 24, 2001

(54) DAMPER MECHANISM

(75) Inventor: Hiroshi Mizukami, Neyagawa (JP)

(73) Assignee: Exedy Corporation, Osaka (JP)

( * ) Notice: Subject to any disclaimer, the term of this patent is extended or adjusted under 35 U.S.C. 154(b) by 0 days.

(21) Appl. No.: 09/348,302

(22) Filed: Jul. 7, 1999

(30) Foreign Application Priority Data

Jul. 14, 1998 (JP) .................................................. 10-198999

(51) Int. Cl.[7] .............................. F16D 3/14; F16D 13/64
(52) U.S. Cl. ....................................... 464/68; 192/213.22
(58) Field of Search ............................... 464/68, 66, 64, 464/63, 67, 83; 192/213.2, 213.21, 213.22

(56) References Cited

U.S. PATENT DOCUMENTS

| | | | |
|---|---|---|---|
| 4,645,053 | * | 2/1987 | Kitayama ................... 464/68 |
| 4,669,594 | * | 6/1987 | Weissenberger et al. ............ 464/68 |
| 4,685,896 | | 8/1987 | Carmillet et al. . |
| 4,700,821 | * | 10/1987 | Maucher et al. ................. 464/68 |
| 4,789,374 | * | 12/1988 | Suzuki ................... 464/68 |
| 5,322,474 | * | 6/1994 | Hashimoto et al. .............. 464/68 |
| 5,505,288 | * | 4/1996 | Tomiyama et al. .............. 464/68 |
| 5,697,846 | | 12/1997 | Uenohara . |
| 5,711,407 | * | 1/1998 | Maier ................... 464/68 |
| 5,722,895 | * | 3/1998 | Graton et al. ................. 464/68 |
| 5,788,041 | * | 8/1998 | Viola et al. ................. 464/68 |
| 5,839,962 | * | 11/1998 | Rohs et al. ................. 464/68 |
| 5,848,937 | * | 12/1998 | Mizukami et al. .............. 464/68 |
| 5,857,914 | * | 1/1999 | Matsuoka ................... 464/68 |
| 5,890,576 | | 4/1999 | Imanaka et al. . |
| 5,893,446 | | 4/1999 | Honjo et al. . |
| 5,899,812 | | 5/1999 | Nagano et al. . |
| 5,954,585 | * | 9/1999 | Nagano et al. ................ 464/68 |
| 6,019,206 | * | 2/2000 | Rohs et al. ................ 192/213.2 |
| 6,050,383 | | 4/2000 | Hashimoto et al. . |
| 6,056,103 | | 5/2000 | Hashimoto et al. . |

\* cited by examiner

Primary Examiner—Lynne H. Browne
Assistant Examiner—Kenneth Thompson
(74) Attorney, Agent, or Firm—Shinjyu global IP Counselors, LLP

(57) ABSTRACT

A clutch disk assembly includes an input rotary member 2, an output rotary member 3, damper mechanisms 4 and 5, a friction mechanism 13 and a friction suppressing mechanism. Damper mechanisms 4 and 5 include a plurality of elastic members 7 and 8 which are arranged between the input and output rotary members 2 and 3 and are circumferentially compressed when the members 2 and 3 rotate relatively to each other. The damper mechanisms 4 and 5 exhibit torsion characteristics in a first region and a second region of relative rotary displacement where the dampening rigidity within the second region is greater than in the first region. The friction mechanism 13 is adapted to generate frictional resistance (hysteresis torque) in the second region of the relative rotary displacement within the clutch disk assembly. A friction suppressing mechanism stops operation of the friction mechanism 13 in response to vibrations having only a magnitude that creates relative rotary displacement within a limited predetermined angular displacement range within the larger second region.

14 Claims, 20 Drawing Sheets

DAMPER MECHANISM

BACKGROUND OF THE INVENTION

A. Field of the Invention

The invention relates to a damper mechanism, and particularly a damper mechanism for transmitting torque and damping torsional vibration.

B. Description of the Background Art

A clutch disk assembly used in a clutch of an automotive vehicle generally has clutch engagement and disengagement functions and a vibration dampening features. The dampening features typically include absorbing and damping vibrations transmitted from the flywheel.

The clutch disk assembly includes a pair of input plates opposed to each other, an output hub integrally provided with a radially outwardly extending flange, and coil springs elastically coupling the input plates to the output hub in the circumferential direction. The coil springs provide some of the vibration dampening features. The paired input plates are fixed to one another by stop pins at their outer peripheral portions, and therefore can rotate together as a single structure. The stop pins extend through recesses formed at the outer periphery of the flange, respectively. The input plate pair can rotate relative to the flange through a predetermined angle range, and the relative rotation between therebetween is limited by contact between the stop pins and circumferential ends of the recesses. As described above, the stop pins couple the paired input plates together, and also serve to limit relative rotation between the input plates and the flange of the hub.

The stop pin must have a predetermined diameter, and must be arranged radially inside the outer peripheries of the paired input plates. Due to the above requirements, the relative torsion angle between the pair of input plates and the flange cannot be increased beyond a certain angular range in the structure employing the stop pins. This means that the performance of coil springs cannot be fully utilized even if the coil springs have a high strength, because the relative torsion angle cannot be increased sufficiently. For reducing gear noises and muffled noises in a drive system during driving, it is necessary to minimize the torsional rigidity during acceleration and deceleration, and thereby set a torsional resonance frequency of the drive system to a value lower than a service speed range of an engine. For achieving a low torsional rigidity and a high stop torque, it is necessary to ensure a wide range for a low torsion angle.

An object of the invention is to provide a damper mechanism, which allows a sufficiently large torsion angle between an input rotary member and an output rotary member, and thereby can suppress vibrations during driving.

SUMMARY OF THE INVENTION

In accordance with one aspect of the present invention, a torque transmission mechanism includes a first rotary member and a second rotary member adapted for limited relative rotation with respect to the first rotary member. A damper mechanism is disposed between the first and second rotary members, the damper mechanism having a plurality of elastic members operably disposed between the first and second rotary members. The elastic members are circumferentially compressed in response to relative rotary displacement between the first and second rotary members. The damper mechanism is adapted to exhibit torsion dampening characteristics within a first region and a second region of angular displacement between the first and second rotary members, the damper mechanism exhibiting a greater degree of rigidity in the second region than in the first region. A friction mechanism within the damper mechanism is adapted to generate frictional resistance in response to relative rotary displacement within at least a portion of the second region. A friction suppression mechanism disposed between the first and second rotary members is adapted to limit operation of the friction mechanism within a predetermined angular displacement range within the second region such that generated friction is reduced within the predetermined angular displacement range. The damper mechanism exhibits a torsional rigidity in the second region of no more than 1.5 kgfm/deg (1.5 kilograms of force•meter per degree).

Preferably, the torsional rigidity in the second region of the torsion characteristics is less than 1.0 kgfm/deg. However, the torsional rigidity in the second region is preferably in a range from 0.6 kgfm/deg to 0.8 kgfm/deg.

Preferably, the friction mechanism and the friction suppression mechanism are adapted such that a first level of hysteresis torque is generated in response to small vibrations that cause relative rotary displacement within the predetermined angular displacement range within in the second region. A second level of hysteresis torque is generated in response to vibrations that cause relative rotary displacement greater than the predetermined angular displacement range within the second range. The first level of hysteresis torque is smaller than the second level of hysteresis torque, such that ratio of the first level to second level is no more than 0.15.

Preferably, the ratio of (first level)/(second level) is no more than 0.10.

Preferably, the ratio of (first level)/(second level) is in a range from 0.03 to 0.05.

Preferably, the first level of hysteresis torque has a magnitude of no more than 0.20 kgfm.

Preferably, the first level of hysteresis torque is no more than 0.10 kgfm.

Preferably, the first level of hysteresis torque is in a range of from about 0.04 kgfm to about 0.08 kgfm.

According to the damper mechanism of the above aspect, a conventional stop pin is not employed, and a plate-like coupling portion is employed for coupling the second and third rotary plates together and restricting the relative torsion angle of the first rotary plate to the second and third rotary plates. Since the plate-like coupling portion is radially shorter than the conventional stop pin, it can be arranged in the radially outermost position of each rotary plate. As a result, the allowed torsion angle of a stop mechanism is not reduced by the window or the like, and can be sufficiently large. Since the allowed maximum torsion angle can be large, the torsional rigidity in the second region of the torsion characteristics can be significantly reduced. As a result, a torsional resonance frequency of a drive system can be reduced below a service speed range of an engine. When a torsional vibration not exceeding the predetermined angle is supplied to the damper mechanism in the second region of the torsion response, the friction suppressing mechanism stops the operation of the friction mechanism so that a large friction resistance does not occur. As a result, gear noises and muffled noises of the drive system during driving are significantly reduced.

DESCRIPTION OF THE PREFERRED EMBODIMENTS

Figure 1:
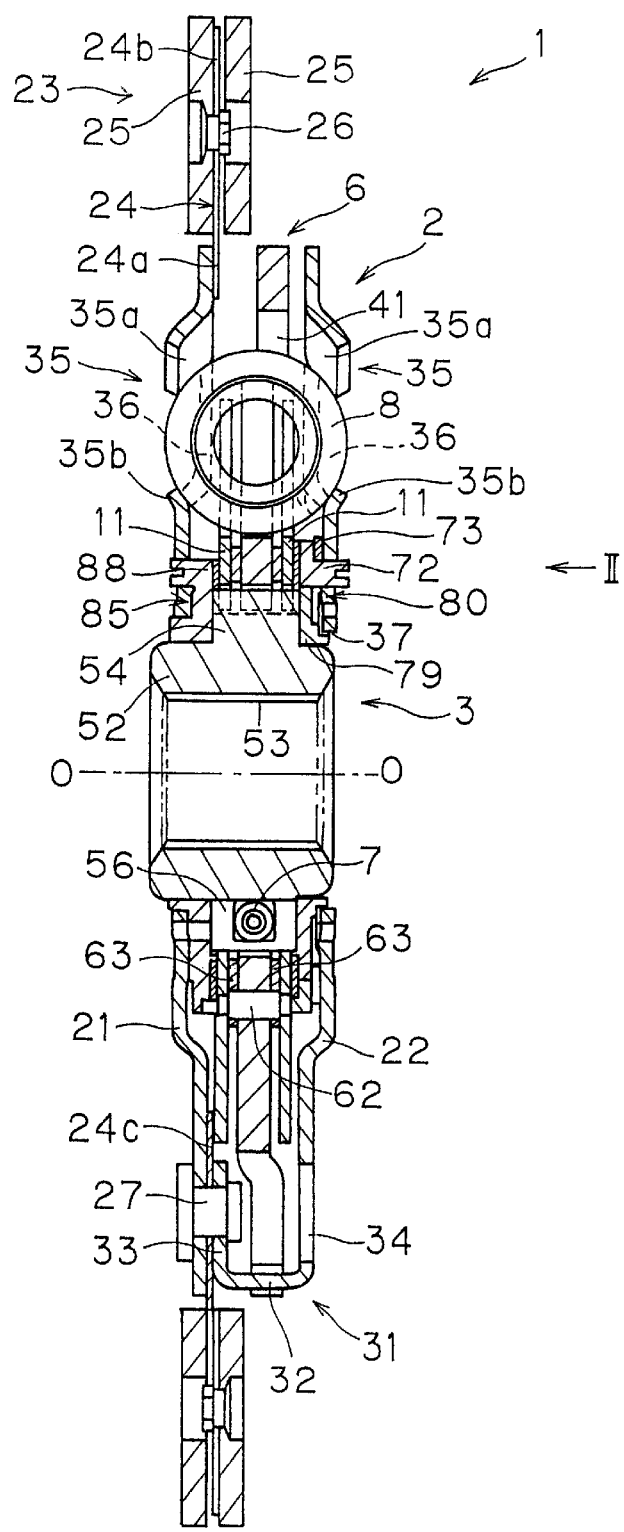
FIG. 1 is a cross sectional side view of a clutch disk assembly.
Figure 2:
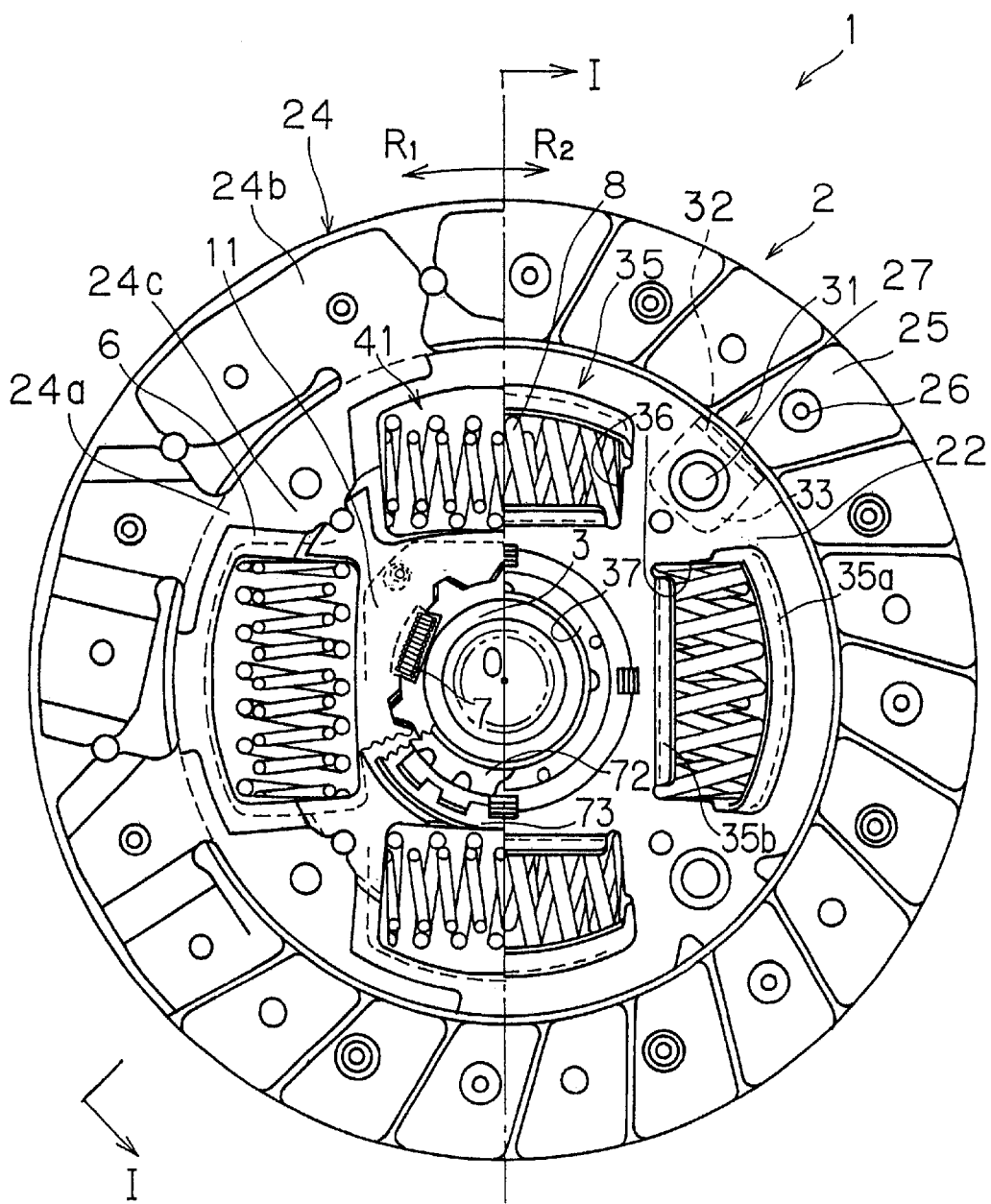
FIG. 2 is a part cutaway, part elevational end view of the clutch disk assembly.

FIG. 1 is a cross section of a clutch disk assembly 1 of one embodiment of the present invention. FIG. 2 is an end view of the same. The clutch disk assembly 1 is a power transmission device for use in a clutch cover assembly in a clutch mechanism of an automotive vehicle. The clutch disk assembly is configured for use with the clutch cover assembly to provide a clutch function and a damper function during clutch operations. In the clutch function, the clutch cover assembly can be used to engage and disengage the clutch disk assembly 1 with a flywheel (not shown) for selectively transmitting torque. The damper function is such that torque variations, vibrations and sudden changes in torque intensity are absorbed by springs and others members of the clutch disk assembly 1, in a manner described in greater detail below. In FIG. 1, 0—0 represents a central axis of a rotary shaft (not shown) which is configured to engage the clutch disk assembly 1, i.e., a rotation axis thereof. An engine and the flywheel (both not shown) are arranged on the left side in FIG. 1, and a transmission (not shown) is arranged on the right side in FIG. 1. R1 indicates a rotating direction (positive side) of the clutch disk assembly 1, and R2 indicates a reverse direction (negative side).

The clutch disk assembly 1 is basically formed of input rotary member 2, an output rotary member 3 (hub) and a damper mechanism arranged between the input and output rotary members 2 and 3. The input rotary member 2 is an assembly that includes a clutch plate 21, a retaining plate 22 and a clutch disk 23. The output rotary member 3 is a hub that is configured for engagement with a shaft that has the central axis 0—0 depicted in FIG. 1. The damper mechanism includes first springs 7, second springs 8, a friction mechanism 13 and other members depicted in FIGS. 1 through 7 and described below.

The input rotary member 2 is a member which is supplied with torque from a flywheel (not shown). The input rotary member 2 is basically formed of the clutch plate 21, retaining plate 22 and clutch disk 23. The clutch plate 21 and the retaining plate 22 are both made of pressed circular or annular metal plates, and are axially spaced apart from one another by a predetermined distance. The clutch plate 21 is disposed on the engine side (with respect to FIG. 1), and the retaining plate 22 is arranged on the transmission side (with respect to FIG. 1). The clutch and retaining plates 21 and 22 are fixed together by plate-like coupling portions 31, described below, so that the predetermined space between the plates 21 and 22 is axially maintained and the plates 21 and 22 can rotate together as a single unit or assembly.

The clutch disk 23 is a friction part configured for friction engagement with the flywheel (not shown). The clutch disk 23 includes a cushioning plate 24 and first and second friction facings 25. The cushioning plate 24 is formed with an annular portion 24a, a plurality of cushioning portions 24b formed on the outer periphery of the annular portion 24a that are circumferentially spaced apart from one another (in a rotating direction), and a plurality of coupling portions 24c extending radially inward from the annular portion. There are four coupling portions 24c, and each coupling portion 24c is fixed to the clutch plate 21 by a rivet 27. The friction facings 25 are fixed to the opposite surfaces of each cushioning portion 24b of the cushioning plate 24 by rivets 26.

Each of the clutch and retaining plates 21 and 22 is provided at its radially outer portion with four windows 35 that are equally spaced from each other in the rotating direction. Each window 35 is provided at its inner and outer peripheries with cut and bent portions 35a and 35b, respectively. The cut and bent portions 35a and 35b are provided for restricting axial and radial movement of the second spring 8, as is described in greater detail below. Each window 35 is also provided at its circumferentially opposite ends with contact portions 36 that are in contact with or close to adjacent ends of the second spring 8, respectively.

The clutch and retaining plates 21 and 22 have central apertures 37 at inner peripheries thereof. The output rotary member 3 is a spline hub that is formed with an axially extending cylindrical boss 52, and a flange 54 extending radially from the boss 52. Opposite ends of the boss 52 of the output rotary member 3 extend through the central apertures 37. The inner periphery of the boss 52 forms a spline aperture 53 engaged with a shaft extending from the transmission (not shown). The flange 54 is provided with a plurality of outer teeth 55 arranged in the rotating direction as well as recesses 56 or the like for accommodating the first springs 7, described below. The recesses 56 are located at two diametrically opposed positions.

A separated flange 6 is a annular plate member which is arranged radially outside the output rotary member 3 between the clutch and retaining plates 21 and 22. The separated flange 6 is elastically coupled to the output rotary member 3 in the rotating direction via contact with the first springs 7, and is further coupled elastically to the input rotary member 2 through contact with the second springs 8.

Figure 5:
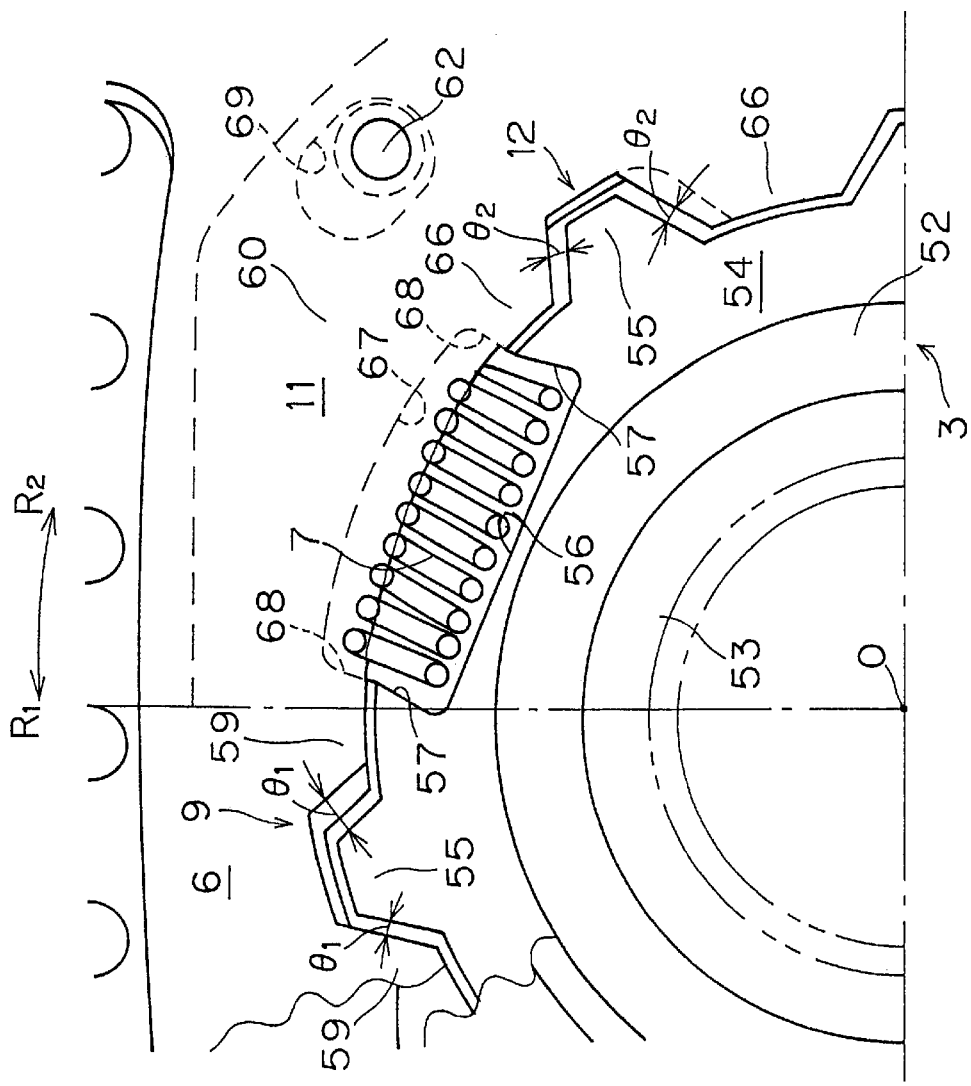
FIG. 5 is a fragmentary, end view of central portion of the clutch disc assembly, on a further enlarged scale, showing details of engagement between a hub, a separated flange and an intermediate plate.

As depicted more clearly in FIG. 5, the separated flange 6 is provided at its inner periphery with a plurality of inner teeth 59. Each of the inner teeth 59 extends between adjacent pairs of the outer teeth 55, and in a torsion free state (no torque or torsion applied to the clutch disk assembly 1) are spaced apart from the outer teeth 55 by a predetermined angle in the rotating direction. The outer and inner teeth 55 and 59 can come into contact with each other in the rotating direction in response to relative rotary displacement between the boss 52 and the separated flange 6. Thus, the outer and inner teeth 55 and 59 form a first stop 9 for restricting torsion angle (relative rotary displacement) between the input rotary member 3 and the separated flange 6. A first torsion angle $\theta 1$ is kept between each outer tooth 55 and the inner tooth 59 on each of the circumferentially opposite sides of the tooth 55. The first torsion angle $\theta 1$ between each outer tooth 55 and the neighboring inner tooth 59 on the R1 side is about 2 degrees, and the first torsion angle $\theta 1$ between each outer tooth 55 and the neighboring inner tooth 59 on the R2 side is about 5 degrees. It should be understood that the first torsion angle $\theta 1$ represents the total relative rotary displacement between the input rotary member 3 and the separated flange 6, the total being about 7 degrees. However, as shown in FIG. 5, with the clutch disk assembly 1 at rest, with no torque or torsion applied thereto, inner teeth 59 are circumferentially off-center with respect to the adjacent teeth 55. Therefore, the first torsion angle $\theta 1$ is greater on one side of each tooth 59 than on the other.

The separated flange 6 is provided at its inner periphery with recesses 67 corresponding to the recesses 56 of the flange 54, respectively. Each of the first springs 7 (two in total number) is arranged in each recess 56 and the recess 67 corresponding to the same. The first springs 7 are less rigid or soft coil springs compared to the second springs 8 (the first springs 7 have a lower spring constant that the second springs 8), and the two first springs 7 operate in parallel. Each first spring 7 has circumferentially opposite ends, which are engaged with circumferentially opposite ends 57 and 68 of the recesses 56 and 67. According to the above structure, the first springs 7 are compressed in the rotating direction through a range of the first torsion angle $\theta 1$ when the output rotary member 3 and the separated flange 6 rotate relatively to each other. Although not shown, spring seats could be disposed at each end of each spring 7 and thereby contact the opposite ends 57 and 68 of the recesses 56 and 67.

The separated flange 6 is provided with circumferentially equally spaced four windows 41. Each window 41 is elongated in the rotating direction. Each circumferential end of each the windows 41 forms a contact portion 44 (identified in FIG. 3). Each window 41 also forms an outer peripheral portion 45 on the radially outer side thereof and an inner peripheral portion 46 on the radially inner side. The outer peripheral portion 45 has arcuate portions and continuously extends circumferentially to close the radially outer side of the window 41. The window 41 may alternatively have an outer peripheral portion which is partially opened radially outward.

The separated flange 6 is also provided with recesses 42 located between the circumferentially neighboring windows 41. Each recess 42 has a radially outwardly diverging form, and edge surfaces 43 are formed on its circumferentially opposite sides, respectively.

The separated flange 6 is provided with projections 49 located radially outside the windows 41. Each projection 49 has a protruding portion that extends radially outward from an outer periphery 48 of the separated flange 6. Each projection 49 is elongated in the rotating direction, and is provided with stop surfaces 50. Each projection 49 has a shorter circumferential length than the window 41, and is circumferentially offset from a central mid-portion of the window 41. Thus, each pair of stop surfaces 50 of each single projection 49 is circumferentially offset from the neighboring edge surfaces 43 of the adjacent recesses 42. In other words, one stop surface 50 of a projection 49 is closer to the adjacent surface 43 than the other stop surface 50 is to its adjacent surface 43. Put another way, each window 41 has contact portions 44. The projection 49 is circumferentially offset from a center defined between contact portions 44 of a single window 41. Therefore, the stop surfaces 50 are not symmetrical with respect to the contact portions 44 of that same single window 41. Alternatively, if the windows 41 are formed with radially open outer portions, the stop surfaces 50 may be formed protrusions extending from the contact portions 44.

The above structure of the separated flange 6 is now described below in another manner. The separated flange 6 has an annular portion at a radially inward side thereof, and also has a plurality of projections 47 projecting radially outward from the annular portion (see FIGS. 3, 6 and 7). In this embodiment, the projections 47 are four in number and are equally spaced from each other in the rotating direction (circumferential direction). Each projection 47 is elongated in the rotating direction, and is internally provided with one of the above described window 41. Each window 41 occupies 70% or more of an area of the projection 47, and is formed in a major portion of the projection 47.

From further another viewpoint, each projection 47 is formed of radially extending two window frame portions 91 on the circumferentially opposite sides (see FIG. 7), and a radially outer window frame portion 92 coupling the radially outer ends of the circumferentially opposite side frame portions 91 together. The circumferentially inner side of each side frame portion 91 forms the contact portion 44, and the circumferentially outer side thereof forms the edge surface 43. The radially inner side of the radially outer frame portion 92 forms the outer peripheral portion 45, and the radially outer side thereof forms the outer periphery 48. The projection 49, described above, is formed on the outer periphery 48. The recess 42, described above, is a space between the circumferentially opposite side frame portions 91 of the projections 47 neighboring to each other in the rotating direction.

The second spring 8 is an elastic member, i.e., a spring used in the damper mechanism of the clutch disk assembly 1. Each second spring 8 is formed of a pair of coaxial coil springs. Each second spring 8 is larger than the first spring 7, and has a larger spring constant than the first springs 7. Each second spring 8 is arranged in the windows 41 and 35. The second spring 8 is circumferentially long, and extends throughout the window 41. Thus, the second spring 8 is compressible within a circumferential angle substantially equal to a circumferential angle $\theta B$ of the window 41, as is described in greater detail below. The circumferentially opposite ends of each second spring 8 are in contact with or close to the contact surfaces 36 and the contact portions 44 of the window 41. The torque of the plates 21 and 22 can be transmitted to the separated flange 6 through the second springs 8. When the plates 21 and 22 rotate relatively to the separated flange 6, the second springs 8 are compressed between them. More specifically, each second spring 8 is compressed in the rotating direction between the contact surface 36 and the contact portion 44 circumferentially opposed to the contact surface 36. In this operation, the four second springs 8 operate in parallel. In a free state where no torsion is present between the separated flange 6 and the plates 21 and 22, the radially inner portion of each of the circumferentially opposite ends of the second spring 8 is in contact with or close to the contact portion 44, but the radially outer portion of each of the circumferentially opposite ends is slightly spaced from the contact portion 44.

The retaining plate 22 is provided at its outer periphery with the four plate-like coupling portions 31 (see bottom of FIG. 1) which are equally spaced from each other in the rotating direction. The plate-like coupling portions 31 couple the clutch and retaining plates 21 and 22 together, and form a portion of the stop in the clutch disk assembly 1 as described below. Each plate-like coupling portion 31 is a plate member integral with the retaining plate 22, and has a predetermined width in the rotating direction. The plate-like coupling portions 31 are arranged correspondingly to positions between the windows 41, i.e., correspondingly to the recesses 42. Each plate-like coupling portion 31 is formed with a stop portion 32 extending axially from the outer periphery of the retaining plate 22, and a fixing portion 33 extending radially inward from the end of the stop portion 32. The stop portion 32 extends toward the clutch plate 21 from the outer periphery of the retaining plate 22. The fixing portion 33 is bent radially inward at the end of the stop portion 32. The plate-like coupling portion 31 described above is integral with the retaining plate 22, and has the substantially same thickness as the retaining plate 22. Therefore, the stop portion 32 has a small radial width corresponding to the thickness of the retaining plate 22. The stop portion 32 has stop surfaces 51 on its circumferentially opposite sides. The radial position of the fixing portion 33 corresponds to the radially outer portion of the window 41, and the circumferential position thereof is intermediate the two windows 41 neighboring to each other in the rotating direction. As a result, the fixing portions 33 are arranged correspondingly to the recesses 42 in the separated flange 6, respectively. The recess 42 is larger than the fixing portion 33. Therefore, the fixing portions 33 can move through the recesses 42, respectively, when the retaining plate 22 is moved axially toward the clutch plate 21 in an assembly operation. Each fixing portion 33 is parallel with the coupling portion 24c of the cushioning plate 24 and is in contact with the surface thereof on the transmission side. The fixing portion 33 is provided with an aperture 33a, into which the foregoing rivet 27 is fitted. Each rivet 27 rigidly couples the fixing portion 33, the clutch plate 21 and the cushioning plate 22 together. The retaining plate 22 is provided with caulking apertures 34 at positions corresponding to the fixing portions 33, respectively.

Description is now given on a second stop 10 formed of the stop portions 32 of the plate-like coupling portions 31 and stop surfaces 50 of the projections 49. The second stop 10 is a mechanism for limiting relative rotation between the separated flange 6 and the input rotary member 2 to a torsion angle θ4. The second springs 8 are compressed between the separated flange 6 and the input rotary member 2 through the torsion angle θ4.

In a plan view in FIGS. 2, 3, 6 and 7, each plate-like coupling portion 31 is located in a position circumferentially between two adjacent windows 41, within the recess 42 and circumferentially between the two projections 49. The stop surfaces 51 of each plate-like coupling portion 31 are located radially outside the outer periphery 48 of the separated flange 6. The stop portion 32 and the projection 49 are in the substantially same radial positions. Therefore, the stop portion 32 and the projection 49 can come into contact with each other when the torsion angle between the separated flange 6 and the plates 21 and 22 increased to an angle corresponding to torsion angle θ4. When the stop surface 51 of the stop portion 32 is in contact with the stop surface 50 of the projection 49, the stop portion 32 is located radially outside the projection 47 of the separated flange 6 and therefore radially outside the window 41. Thus, each stop portion 32 can move to a position radially outside the circumferentially inner portions of the projection 47 and the window 41.

Advantages of the second stop 10 described above are as follows. Since each stop portion 32 has a plate-like form, its circumferential angle or angular length is smaller than the conventional stop pin. The radial length of the stop portion 32 is significantly shorter than the conventional stop pin. Thus, the radial length of the stop portion 32 is substantially equal to the thickness of the plate 21 or 22. This means that the substantial radial length of the second stop 10 is restricted to a short value corresponding to the thickness of the plate 21 or 22.

Each stopper portion 32 is arranged in the outer peripheral portions, i.e., the radially outermost positions of the plates 21 and 22, and is located radially outside the projection 47 and particularly the outer periphery 48 of the window 41. Since the stopper portion 32 is radially outward from the window 41, no interference occurs in the rotating direction between the stop portion 32 and the window 41. Consequently, both the maximum torsion angle of the damper mechanism allowed by the second springs 8 and the torsion angle of the second spring 8 can be increased. If the stop portion were in the same radial position as the window, interference would occur between the torsion angle of the damper mechanism determined by the second springs and the circumferential angle of the window, and therefore it would be impossible to achieve a wide angle of the damper mechanism and a low rigidity of the springs.

In particular, since the radial length of the second stop 10 is significantly shorter than that of the conventional stop pin, the second stop 10 arranged radially outside the window 41 does not extremely increase the outer diameters of the plates 21 and 22. Also, the radial length of the window 41 is not extremely reduced.

Intermediate plates 11 are formed of a pair of plate members, which are arranged radially outside the output rotary member 3, but are disposed between the clutch plate 21 and the separated flange 6 and between the separated flange 6 and the retaining plate 22, respectively. The intermediate plates 11 are made of circular or annular plate members, respectively, and form a portion of the damper mechanism between the input and output rotary members 2 and 3. Each intermediate plate 11 is provided at its inner periphery with a plurality of inner teeth 66. The inner teeth 66 axially overlap the inner teeth 59 of the separated flange 6. The inner teeth 66 are spaced in the rotating direction by a predetermined distance from the outer teeth 55 of the output rotary member 3 (hub), respectively. Through the range of this space, therefore, the output rotary member 3 and the intermediate plate 11 can rotate relative to each other. The outer and inner teeth 55 and 59 form a third stop 12 for restricting the relative rotation angle between the output rotary member 3 and the intermediate plate 11. More specifically, as shown in FIG. 5, a space of second torsion angle θ2 is kept between each outer tooth 55 and each of the inner teeth 66 on the circumferentially opposite sides thereof. In this embodiment, the second torsion angles 62 of the circumferential opposite spaces are equal to each other, and are about 2 degrees. The second torsion angle θ2 is not larger than the first torsion angle θ1. This relationship is kept between the angles on the circumferentially same side.

Figure 3:
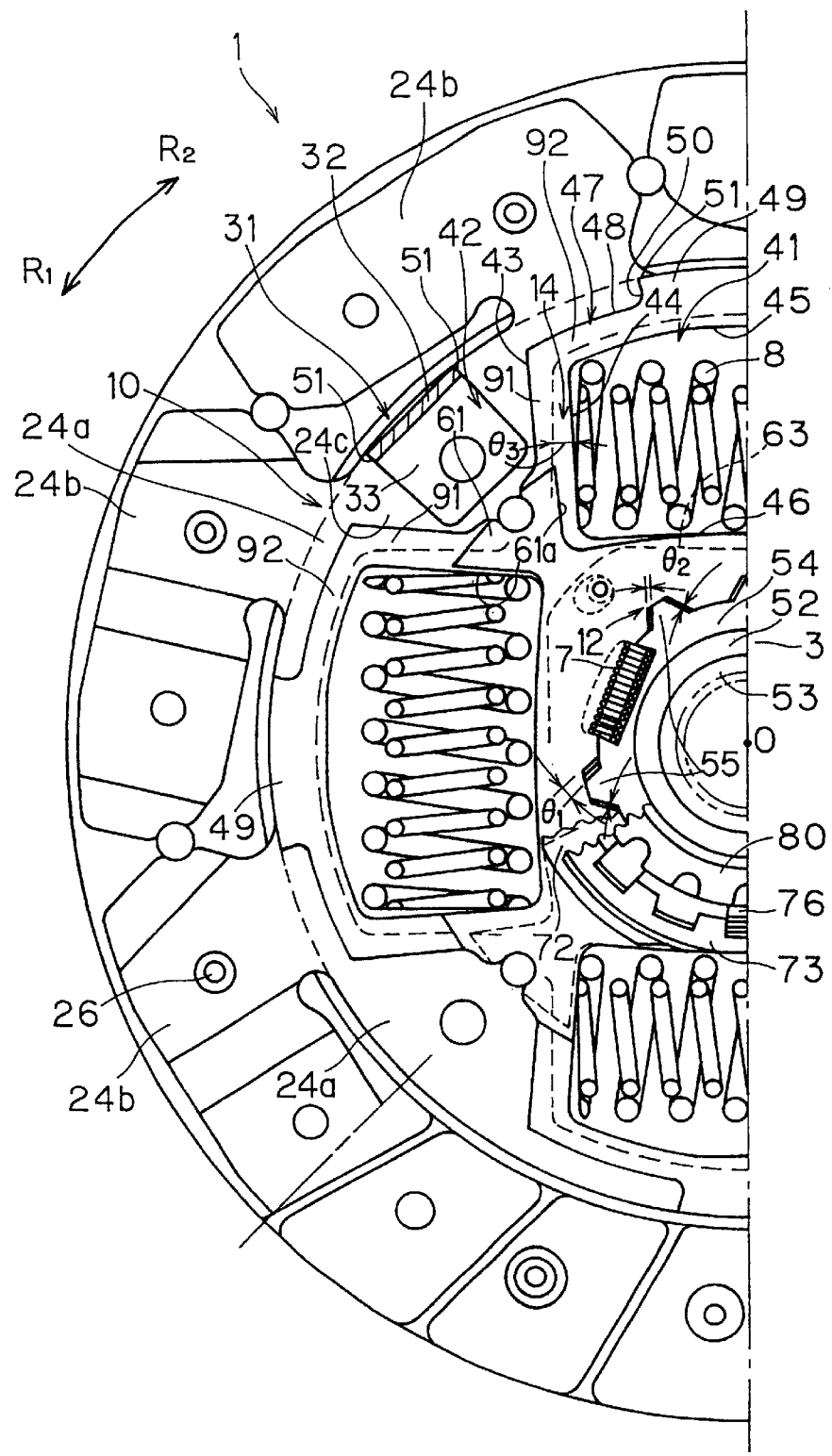
FIG. 3 is a fragmentary cutaway end view showing details of the clutch disk depicted in FIGS. 1 and 2 on a slightly enlarged scale.
Figure 4:
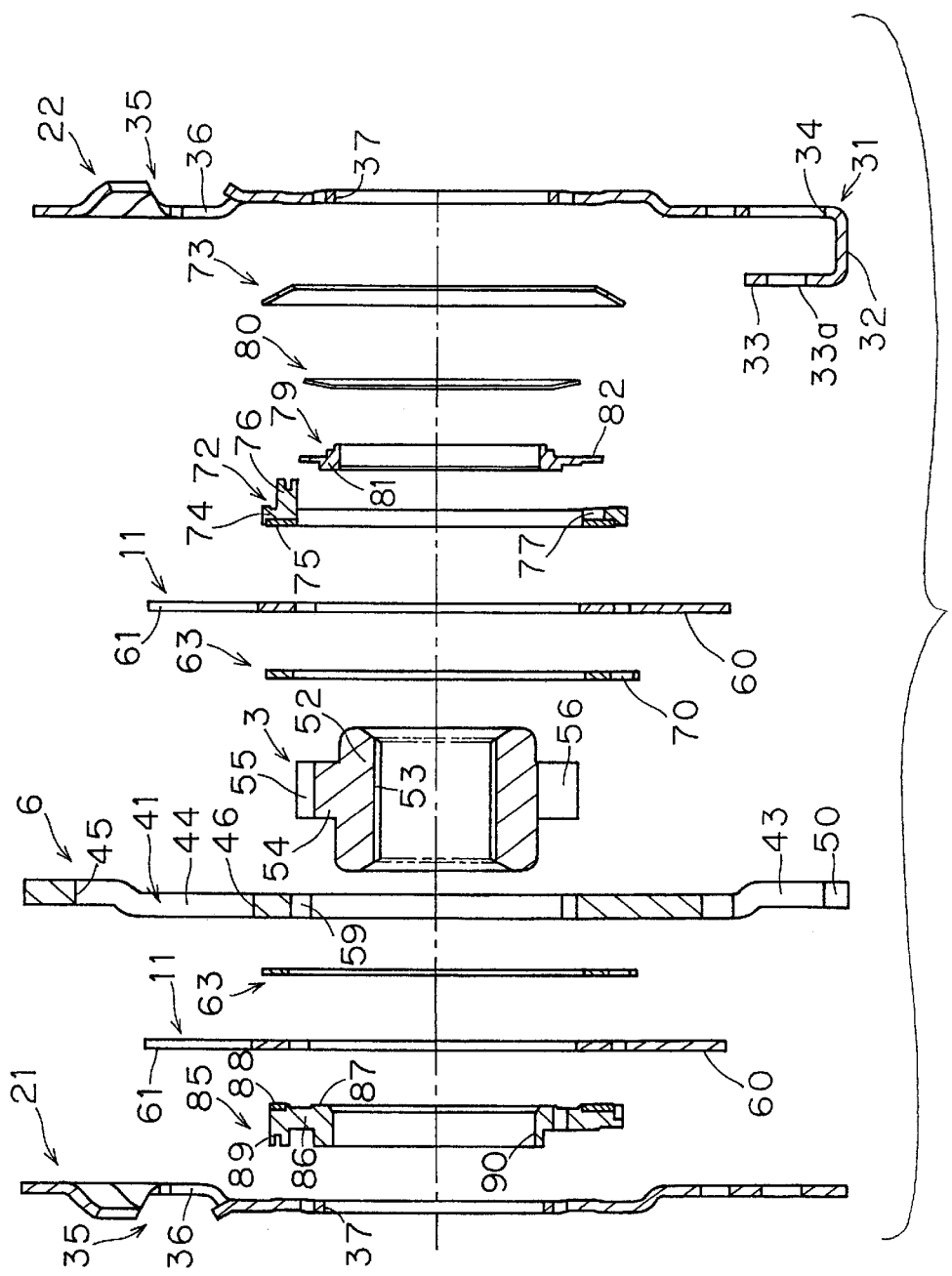
FIG. 4 is an exploded side view of a portion of the clutch disk assembly depicted in FIGS. 1, 2 and 3.

Each intermediate plate 11 is provided with engagement portions 61 projecting radially outward (see FIG. 3). Each engagement portion 61 is arranged between the windows 45 of the separated flange 6. The engagement portion 61 has the radially outer end located near the radially middle portion of the window 41. Each engagement portion 61 has a radially outwardly diverging form. The circumferentially opposite ends of each engagement portion 61 can engage with the radially inner portions of the second springs 8 located on the circumferentially opposite sides thereof. Circumferential spaces corresponding to third angles 63 are defined between circumferentially opposite end surfaces 61a of each engagement portion 61 and the corresponding circumferential ends of the second springs 8 (see the upper half of FIGS. 3 and 6). In this embodiment, the third angle θ3 between each engagement portion 61 and the second spring 8 on the R2 side is about 4 degrees, and the third angle θ3 to the second spring 8 on the R1 side thereof is about 1 degree. Each third angle θ3 is larger than the difference between the first and second torsion angles θ1 and θ2. The respective sizes of the third angle θ3 on each opposite end of each second spring 8 is constant around all of the second springs 8 with the clutch disk assembly 1 in a torsion free state.

The paired intermediate plates 11 are non-rotatably coupled together by a plurality of pins 62. In other words, the pair of intermediate plates 11 are fixed to one another via the pins 62 such that they rotate together as a single unit or assembly. Each pin 62 is formed of a shank and projected portions extending axially from the opposite ends of the shank. The paired intermediate plates 11 are in axial contact with the shanks of the pins 62 and thereby are prevented from axially moving with respect to each other. The projected portions are fitted into apertures in the plates 11, respectively. A spacer is arranged between each intermediate plate 11 and the separated flange 6. Each spacer 63 is an annular plate member which is arranged between the radially inner portion of the intermediate plate 11 and the radially inner annular portion of the separated flange 6. The spacer 63 is provided with apertures through which the shanks of pins 62 extend, respectively, and can rotate together with the intermediate plate 11 owing to engagement of the pins 62 in these apertures. Coating is applied to a surface of the spacer 63, which is in contact with the flange 6, for reducing the friction coefficient thereof. The separated flange 6 is provided with long apertures 69 through which the pins 62 extend, respectively. The long apertures 69 allow the pins 62 to move in the rotating direction with respect to the separated flange 6.

Description is now given on members forming the friction mechanism. As shown in FIG. 5, the second friction washer 72 is arranged between the inner peripheral portion of the intermediate plate 11 on the transmission side (right side of FIG. 4) and the inner peripheral portion of the retaining plate 22. The second friction washer 72 is basically formed of a body 74 made of resin and a friction plate 75 molded on the body 74. The friction plate 75 is in contact with the surface of the intermediate plate 11 on the transmission side thereof. Engagement portions 76 extend from the inner peripheral portion of the body 74 toward the transmission side. The engagement portions 76 are non-rotatably engaged with the retaining plate 22, and are axially fitted to the plate 22. A plurality of concavities 77 are formed in the transmission side of the inner peripheral portion of the body 74. A second conical spring 73 is arranged between the body 74 and the retaining plate 22. The second conical spring 73 in the assembled state is compressed between the body 74 of the second friction washer 72 and the retaining plate 22. Thereby, the friction plate 75 of the second friction washer 72 is strongly pressed against the first intermediate plate 11.

A first friction washer 79 is arranged between the flange 54 and the inner peripheral portion of the retaining plate 22. Thus, the first friction washer 79 is arranged radially inside the second friction washer 72 and radially outside the boss 52. The first friction washer 79 is made of resin. The first friction washer 79 is basically formed of an annular body 81, from which a plurality of projections 82 extend radially outward. The body 81 is in contact with the flange 54, and the projections 82 are non-rotatably engaged with the concavities 77 of the second friction washer 72. Thereby, the first friction washer 79 can rotate together with the retaining plate 22 with the second friction washer 72 therebetween.

A first conical spring 80 is arranged between the first friction washer 79 and the inner peripheral portion of the retaining plate 22. The first conical spring 80 in the assembled state is axially compressed between the first friction washer 79 and the inner peripheral portion of the retaining plate 22. The biasing force of the first conical spring 80 is smaller than the biasing force of the second conical spring 73. Since the friction surface of the first friction washer 79 is formed on the resin portion, its friction coefficient is smaller than the second friction washer 72. Accordingly, the friction (hysteresis torque) produced by the first friction washer 79 is significantly smaller than the friction produced by the second friction washer 72.

A third friction washer 85 is arranged to be disposed between the inner peripheral portion of the clutch plate 21, the flange 54 and the inner peripheral portion of the intermediate plate 11. The third friction washer 85 is an annular member made of resin. The third friction washer 85 is basically formed of an annular body 86. A friction plate 88 is arranged on the radially outer portion of the surface of the annular body 86 opposed to the transmission side, and a friction surface 87 of resin is formed on the radially inner portion of the surface of the body 86 opposed to the transmission. The friction plate 88 is in contact with the inner peripheral portion of the intermediate plate 11 on the engine side (the left side of FIG. 4). The friction surface 87 of the resin is in contact with the engine side surface of the flange 54. The third friction washer 85 is provided at its inner peripheral portion with an annular cylindrical portion 90 projecting toward the engine. The inner peripheral surface of the cylindrical portion 90 is in slidable contact with the outer peripheral surface of the boss 52. A plurality of engagement portions 89, which are spaced from each other in the rotating direction, project from the outer peripheral portion of the body 86 toward the engine side. The engagement portions 89 are engaged in apertures formed in the clutch plate 21 so that the third friction washer 85 is non-rotatably engaged with the clutch plate 21 and is axially fitted to the same.

In the friction mechanism described above, the friction mechanism 13 which generates a relatively high hysteresis torque is formed between, on the one hand, the friction plate 75 of the second friction washer 72 and the friction plate 88 of the third friction washer 85, and on the other hand, the intermediate plate 11. Further, the friction surface on the body 81 of the first friction washer 79 and the resin friction surface 87 of the third friction washer 85 cooperate with the flange 54 to form a friction mechanism 15 which generates a relatively low hysteresis torque.

Angles and relationships relating to the second springs 8 and the second stop 10 will now be described below more in detail. The "circumferential angle" in the following description means the angle in the circumferential direction (i.e., rotating direction of the clutch disk assembly 1) between two positions around the rotation axis 0—0 of the clutch disk assembly 1. The absolute values of the angles, which will be used in the following description, are merely examples in the clutch disk assembly shown in the figures, and in should be understood that the present invention is not restricted to the example values.

Figure 6:
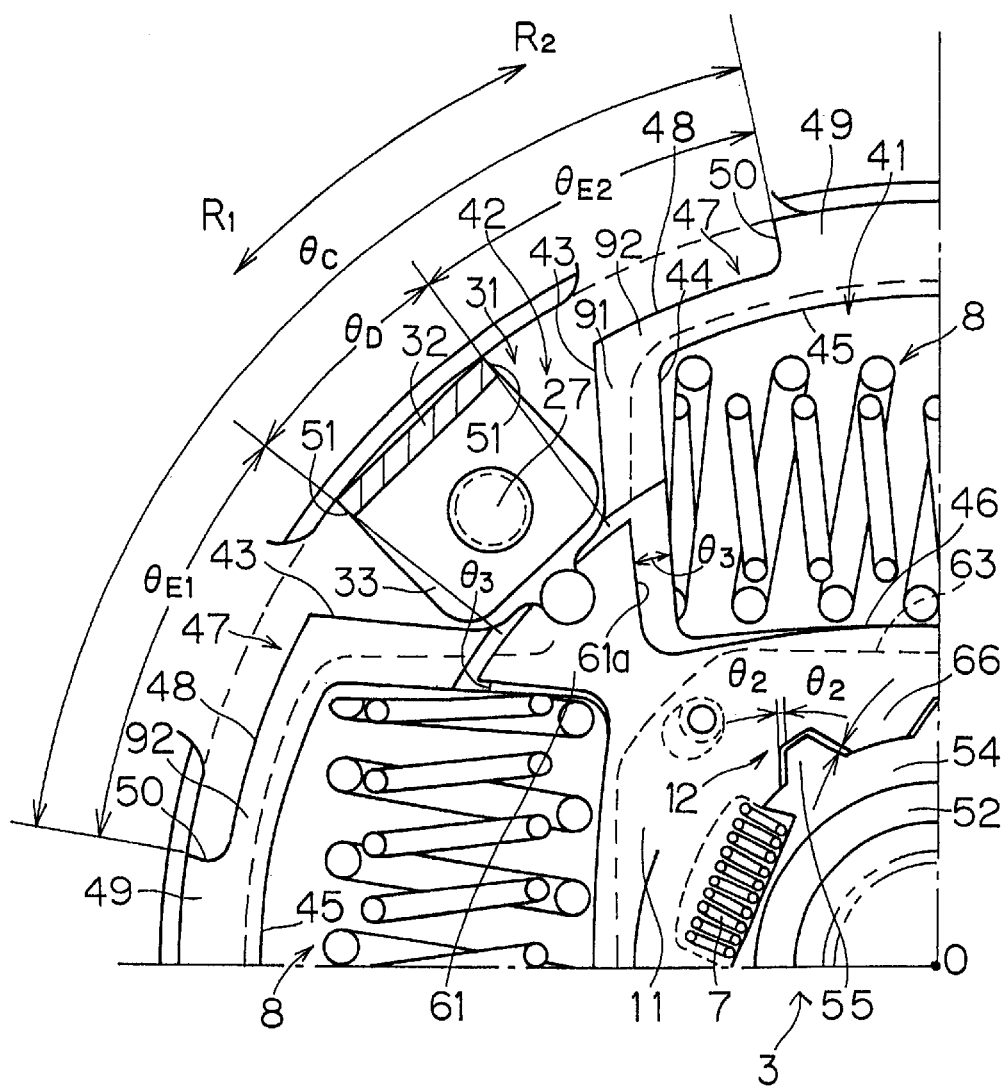
FIG. 6 is a fragmentary, part elevation, part cross sectional end view of a portion of the clutch disc assembly showing angles between various portions thereof, the angles representing torsional displacement angles of between the respective portions of the clutch disc assembly.
Figure 7:
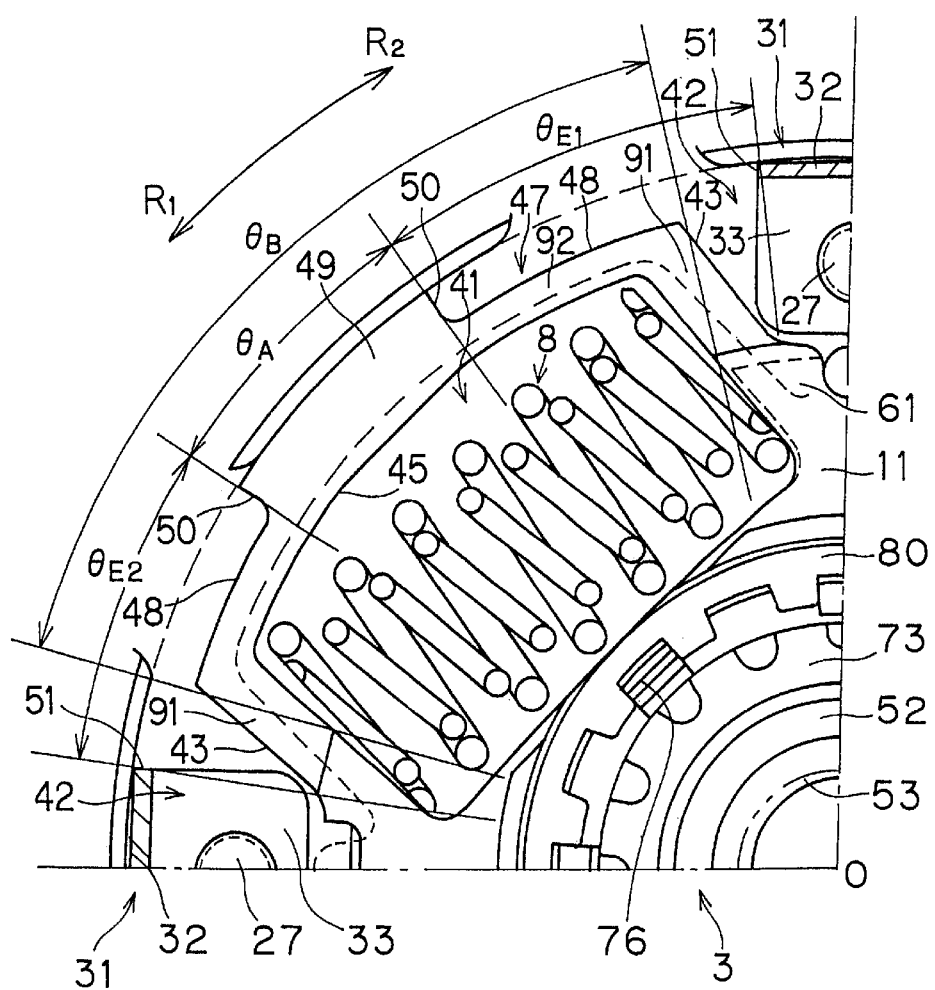
FIG. 7 is a fragmentary, part elevation, part cross sectional end view showing another portion of the clutch disc assembly showing further angles between various portions thereof, the angles representing torsional displacement angles of between the respective portions of the clutch disc assembly.
Figure 20:
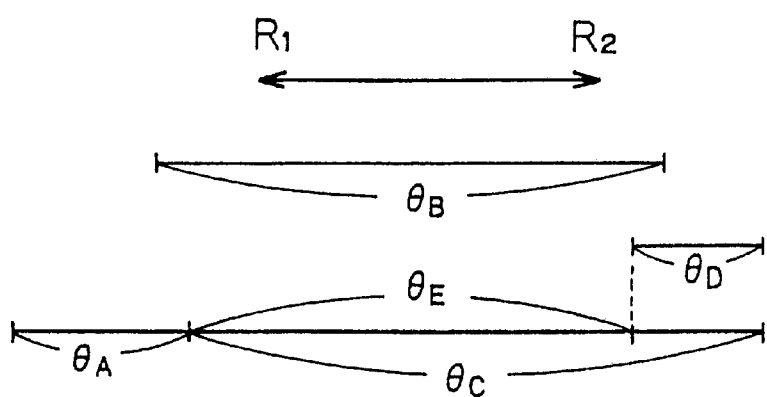
FIG. 20 is a diagram showing operational relationships between respective torsion angles of the clutch disk assembly.

Various circumferential angles $\theta A$–$\theta E$ are shown in FIGS. 6 and 7. FIG. 20 is a diagram showing relationships between these circumferential angles $\theta A$–$\theta E$.

Relationship Between $\theta A$ and $\theta C$

The circumferential angle $\theta A$ of each projection 49 is smaller than the circumferential angle $\theta C$ between the neighboring circumferential ends of the circumferentially neighboring projections 49 (i.e., between the circumferentially opposed stopper surfaces 50). As can be seen from FIG. 20, the angles $\theta A$ and $\theta C$ establish such a relationship that as one increases, the other decreases. The angle $\theta A$ employed in this embodiment is much smaller than the angle $\theta C$, whereby $\theta C$ is increased above the conventional value. By increasing the circumferential space angle $\theta C$ between the projections 49, it is possible to increase the torsion angle $\theta E$ of the separated flange 6 with respect to the plates 21 and 22. In the clutch disk assembly 1 of the embodiment of the invention shown in the figures, each angle $\theta A$ is approximately 21 degrees, and each angle $\theta C$ is approximately 69 degrees.

The angle $\theta C$ of 40 degrees or more can achieve a superior effect which cannot be achieved in the prior art. The angle $\theta C$ ranging from 50 to 80 degrees can improve the effect, the angle $\theta C$ ranging from 60 to 80 degrees can further improve effect, and the angle $\theta C$ ranging from 65 to 75 degrees can achieved the best effect.

The angle $\theta C$ of ½ or less of $\theta A$ can achieve a sufficient effect. The angle $\theta C$ of ⅓ or less of OA can further improve the effect. In the figures, a ratio between $\theta C$ and $\theta A$ is 1:3.29. The ratio in a range from 1:2 to 1:6 can achieve a sufficient effect, and the ratio in a range from 1:2.5 to 1:5.5 can further improve the effect.

Relationship Between $\theta C$ and $\theta D$

The circumferential angle $\theta D$ of each plate-like coupling portion 31 (stopper portion 32) is much smaller than the foregoing angle $\theta C$. As can be seen from FIG. 20, a difference obtained by subtracting $\theta D$ from $\theta C$ is equal to the maximum allowable torsion angle $\theta E$ (stopper angle of the damper mechanism) between the separated flange 6 and the plates 21 and 22. Thus, the damper mechanism has the maximum allowable torsion angle $\theta E$ larger than that in the prior art. It can be seen from FIG. 20 that it is necessary to increase $\theta C$ and decrease $\theta D$ for increasing $\theta E$. In this embodiment, $\theta D$ is 16 degrees. The angle $\theta D$ is preferably 20 degrees or less, and more preferable is in a range from 10 to 20 degrees.

When $\theta D$ is ½ or less of $\theta C$, $\theta D$ can be sufficiently large. If $\theta D$ is ⅓ of $\theta C$, $\theta E$ can be further large. If $\theta D$ is ¼ or less of $\theta C$, $\theta E$ can be maximum. In the figure, a ration between $\theta D$ and $\theta E$ is 1:4.31. If this ratio is in a range from 1:2 to 1:6, $\theta E$ can be sufficiently large. If it is in a range from 1:3 to 1:6, $\theta E$ can be further increased. If it is in a range from 1:3.5 to 1:5.0, $\theta E$ can be maximum.

In this embodiment, $\theta E$ is equal to 53 degrees. $\theta E$ is preferably equal to 20 degrees or more. $\theta E$ is more preferably equal to 30 degrees or more. Particularly, if it is in a range from 40 to 60 degrees, it is possible to achieve a sufficiently wide angle which cannot be achieved in the prior art. It is further preferably in a range from 45 to 55 degrees.

In the present invention, it should be understood that the relative rotary displacement between the various members of the clutch disc assembly 1 may be divided into two general ranges of displacement, a first range (first region) and a second range (second region). The first range is defined as the relative rotary displacement between the separated flange 6 and the boss 52 (as the springs 7 are compressed). The second range is defined the relative rotary displacement between the separated flange 6 and the plates 21 and 22 (as the springs 8 are compressed). The first range approximately corresponds to the area of the graph labeled by the letter B in FIG. 19. The second range is represented by the lines extending to the left and right of the area of the graph labeled by the letter B.

Increase in allowed maximum torsion angle $\theta E$ achieves the following advantages. By increasing the allowed maximum torsion angle, the rigidity of the springs (second springs 8) for the second stage in the torsion characteristics can be reduced without lowering the stop torque. In this embodiment, the rigidity of the second springs 8 is reduced to about 50% of that in the prior art. This can reduce a shock which may occur during transition from the first stage to the second stage (i.e., initial upward shock caused when depressing the accelerator).

The projection 49 is shifted in the rotating direction from the projection 47 and the window 41. More specifically, the circumferential center of the projection 49 is shifted toward the R1 side from the circumferential centers of the projection 47 and the window 41. Therefore, each projection 49 is spaced from the stop surfaces 51 on its circumferentially opposite sides by different angles, respectively. In other words, each stop portion 32 located circumferentially between the projections 49 is shifted toward the R2 side. Accordingly, the space angle $\theta E1$ (Q4) between the stop portion 32 and the neighboring projection 49 on the R1 side is larger than the space angle $\theta E2$ between the stop portion 32 and the neighboring projection 49 on the R2 side.

Relationship Between $\theta B$ and $\theta D$

The windows 41 formed in the separated flange 6 are four in total number, and each window 41 has a circumferential angle $\theta B$ of 50 degrees or more. The angle $\theta B$ is determined between the radially middle portions of the contact portions 44. In the figure, the angle $\theta B$ is equal to 61 degrees. Consequently, it is possible to use the springs, which are sufficiently long in the rotating direction, and thus allow the large maximum torsion angle. The angle $\theta B$ is preferably in a range from 50 to 70 degrees, and more preferably in a range from 55 to 65 degrees.

The circumferential angle $\theta D$ of each projection 49 is smaller than the circumferential angle $\theta B$ of the window 41. This means that the ratio of $\theta E$ to $\theta B$ is sufficiently large. The window 41 and the second spring 8 are increased in angle, and further the maximum torsion angle of the damper mechanism is sufficiently increased, whereby the function of the springs is effectively utilized, and it is possible to provide the characteristics of the further large torsion angle and the further low torsional rigidity.

If ED is equal to ½ or less of $\theta B$, a sufficient effect can be achieved. If $\theta D$ is equal to ⅓ or less of $\theta B$, a further sufficient effect can be achieved. In this embodiment, a ratio of $\theta D$ to $\theta B$ is equal to 1:3.81. If this ratio is in a range from 1:2 to 1:4, the ratio of $\theta E$ to $\theta B$ is sufficiently large. If the ratio is in a range from 1:2.5 to 1:4.0, the ratio of $\theta E$ to $\theta B$ is even larger. If the ratio is in a range from 1:2.75 to 1:3.75, the ratio of $\theta E$ to $\theta B$ is maximized.

Relationship Between $\theta A$ and $\theta B$

The circumferential angle $\theta A$ of each projection 49 is smaller than the circumferential angle $\theta B$ of each window 41. The fact that a ratio of $\theta A$ to $\theta B$ is smaller than that in the prior art means that a ratio of $\theta C$ to $\theta B$ is larger than that in the prior art. In other words, the ratio of θC to θB can be sufficiently increased to satisfy the precondition that the maximum allowable torsion angle θE can be increased with the windows 41 allowing the large maximum torsion angle. The circumferential angle θA of each projection 49 which is ⅔ or less of θB can achieve a sufficient effect. The angle θA of ½ or less of θB is more preferable, and the angle θA of ⅓ or less is further preferable. In the figures, a ratio between θA and θA is 1:2.90. A ratio between θA and θB is preferably in a range from 1:2 to 1:4, more preferably from 1:2.5 to 1:4.0 and further preferably from 1:2.75 to 1:3.75. The angle θC is larger than the angle θB.

Relationship Between θB and θE

Both the angles θE and θB are larger than those in the prior art, and thus both the maximum allowable torsion angles of the damper mechanism and the torsion angle of the second spring 8 are large. Increase in size of the second springs 8 facilitates design thereof improves their performance (large torsion angle and low rigidity).

From comparing θB and θE, it can be seen that θB is larger than θE but the difference between them is very small. Thus, a ratio of θE to θB is sufficiently large. As a result, it is possible to provide the maximum torsion angle θE which can sufficiently utilize the large torsion angle allowed by the windows 41 and therefore the second springs 8. A ratio of θB to θE is 1:1.13. If this ratio is in a range from 1:1.0 to 1:1.3, a sufficient effect can be achieved, and the range from 1:1.1 to 1:1.2 can further improve the effect.

Radial Length of Window 41

In this damper mechanism, the window 41 has a radial length sufficiently larger than the radial length of the separated flange 6. This allows an increase in size of the second springs 8 accommodated in the windows 41, respectively. The radial length of the window 41 is 35% or more of the radius of the separated flange 6. If the ratio is in a range from 35% to 55%, an intended effect can be sufficiently achieved, and the range from 40 to 50% can further achieve the effect.

Figure 8:
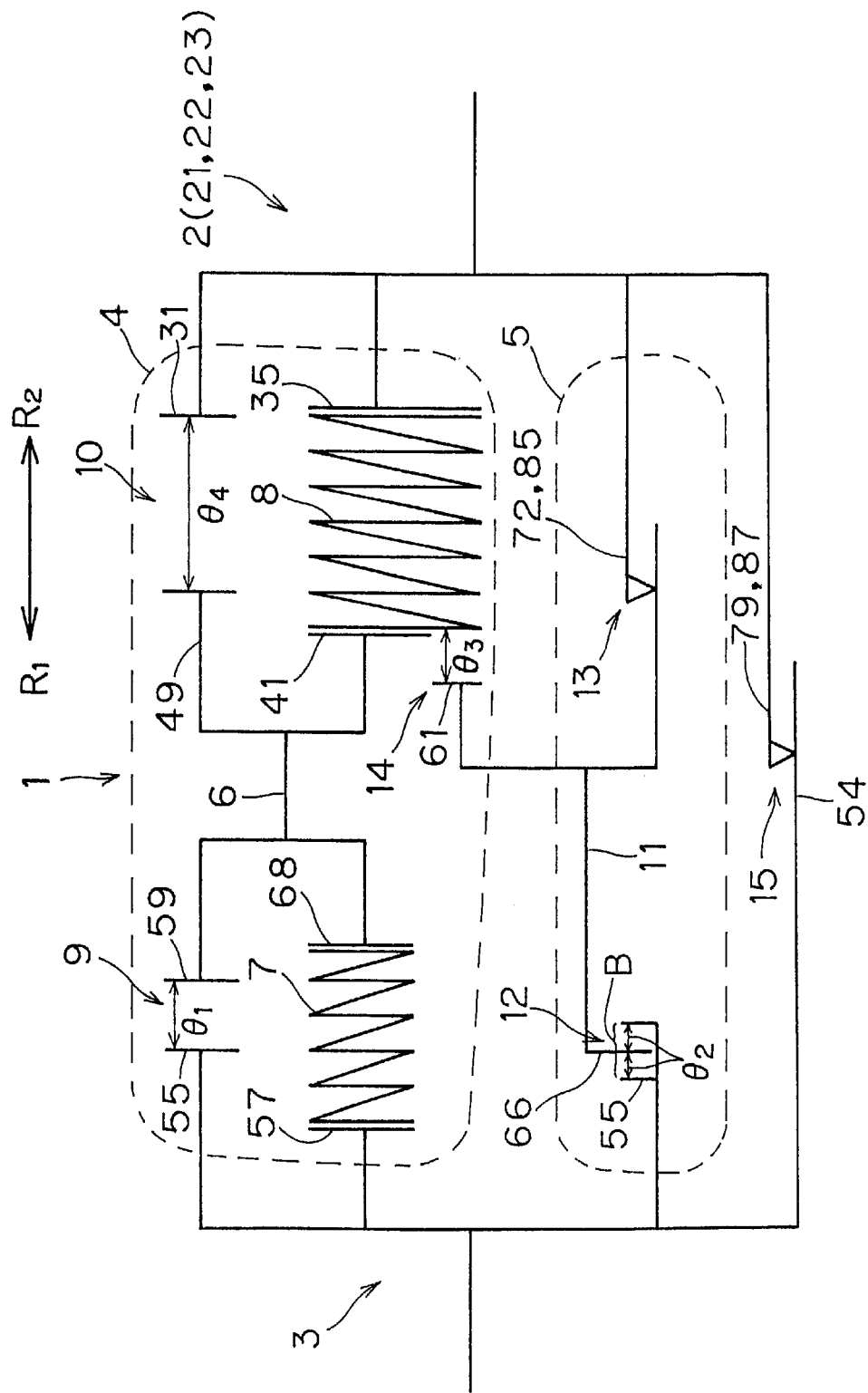
FIG. 8 is a mechanical circuit diagram schematically showing various portions of a damper mechanism of the clutch disk assembly.

The structure of the clutch disk assembly 1 is described below in more detail with reference to FIG. 8. FIG. 8 is a mechanical circuit diagram of the damper mechanism of the clutch disk assembly 1. This mechanical circuit diagram schematically shows the damper mechanism, and represents operations and relationships of respective members which are performed and established when the output rotary member 3 is twisted in one direction (e.g., toward R2 side) with respect to the input rotary member 2. As can be seen in the figure, a plurality of members forming the damper mechanism are arranged between the input and output rotary members 2 and 3. The separated flange 6 is arranged between the input and output rotary members 2 and 3. The separated flange 6 is circumferentially and elastically coupled to the output rotary member 3 through the first springs 7. The first stop 9 is formed between the separated flange 6 and the output rotary member 3. The first springs 7 can be compressed through the first torsion angle θ1 in the first stop 9. The separated flange 6 is circumferentially and elastically coupled to the input rotary member 2 through the second springs 8. The second stop 10 is formed between the separated flange 6 and the input rotary member 2. The second springs 8 can be compressed through a fourth torsion angle θ4 in the second stop 10. As described above, the input and output rotary members 2 and 3 are elastically coupled together in the rotating direction through the first and second springs 7 and 8 arranged in series. In this structure, the separated flange 6 functions as an intermediate member arranged between the two kinds of springs.

The structure described above can be considered as a damper formed of the first springs 7 and the first stop 9 arranged in parallel with one another (as shown in the upper left portion of FIG. 8) and is further arranged in series with another damper that includes the second springs 8 and the second stop 10 arranged in parallel with one antoher. The structure described above can also be deemed as the first damper mechanism 4, as indicated in dashed lines in FIG. 8, which elastically couples the input and output rotary members 2 and 3 together in the rotating direction. The rigidity of the first springs 7 is significantly smaller compared to the rigidity of the second springs 8. Therefore, the second springs 8 are hardly compressed in the rotating direction within a range smaller than the first torsion angle θ1.

The intermediate plate 11 is arranged between the input and output rotary members 2 and 3. The intermediate plate 11 has a portion engagable with the second springs 8. The intermediate plate 11 forms the third stop 12 which has a rotational limiting space of the second torsion angle θ2 with respect to the output rotary member 3. The third stop 12 provides a space for allowing relative rotation between the output rotary member 3 and the intermediate plate 11 when minute torsional vibrations are transmitted to the mechanism in the first stage range, as is described below. The intermediate plate 11 is frictionally engaged in the rotating direction with the input rotary member 2 through the friction mechanism 13. Further, the intermediate plate 11 has the engagement portions 61, which are spaced from the circumferentially opposite ends of the second springs 2 by spaces of the third torsion angle θ3, respectively. In the intermediate plate 11 described above, the third stop 12 and the friction mechanism 13 are arranged in series with each other, and this arrangement achieves the second damper mechanism 5 coupling the input and output rotary members 2 and 3 in the rotating direction. The second damper mechanism 5 is arranged to operate in parallel with the first damper mechanism 4.

Description is now be given on relationships between the angles θ1–θ4 of the damper mechanisms shown in FIG. 8. The angles described below are determined between the output rotary member 3 and the input rotary member 2 on the negative side of the output rotary member 3 (i.e., the input rotary member 2 and the output rotary member 3 on the positive side or R1 direction side). The first torsion angle θ1 is the maximum positive torsion angle allowed in the damper mechanism having the first springs 7. The fourth torsion angle θ4 in the second stop 10 is equal to a maximum positive torsion angle θE allowable in the damper mechanism having the second springs 8. A total of the first and fourth torsion angles θ1 and θ4 is equal to the maximum positive torsion angle allowed in the whole damper mechanism of the clutch disk assembly 1.

The second torsion angle θ2 must be equal to or smaller than the first torsion angle θ1. For example, the first torsion angle θ1 is 5 degrees and the second torsion angle is 2 degrees in this embodiment. A difference between the first and second torsion angles θ1 and θ2 must be smaller than the third torsion angle θ3. A value obtained by subtracting the third torsion angle θ3 from the difference between the first and second torsion angles θ1 and θ2 is equal to a space angle A (see FIGS. 12 and 19) for preventing operation of the friction mechanism 13 when minute torsional vibrations are supplied in the second stage of the torsion characteristics.

The space angle A in this embodiment is 1 degree, and is preferably in a range from 1 to 2 degrees. A total of the positive and negative second torsion angles θ2 is a total space angle B (see FIG. 19) for preventing operation of the friction mechanism 13 when minute torsional vibrations are supplied in the first stage of the torsion characteristics. In this embodiment, the positive and negative second torsion angles θ2 are both equal to 2 degrees, and the total space angle B is equal to 4 degrees. The total space angle B is preferably larger than the space angle A, and is more preferably equal to double the space angle A or more. The total space angle B in a range from 3 to 5 degrees can achieve a good effect.

As shown in FIG. 8, the friction mechanism 15 is arranged between the input and output rotary members 2 and 3. The friction mechanism 15 is adapted to generate slide whenever relative rotation occurs between the input and output rotary members 2 and 3. In this embodiment, the friction mechanism 15 is basically formed of the first and second friction washers 72 and 85, but may be formed of members other than the above. In some cases, it is desirable that the hysteresis torque generated in the friction mechanism 15 is as small as possible.

Characteristics of the damper mechanism in the clutch disk assembly 1 are described below with reference to mechanical circuit diagrams of FIGS. 8 to 18 and a torsion characteristic diagram of FIG. 19. This torsion characteristic diagram shows a relationship between the torsion angle and the torque in the operation of twisting the input and output rotary members 2 and 3 relatively to each other between the maximum allowable positive and negative torsion angles.

Figure 12:
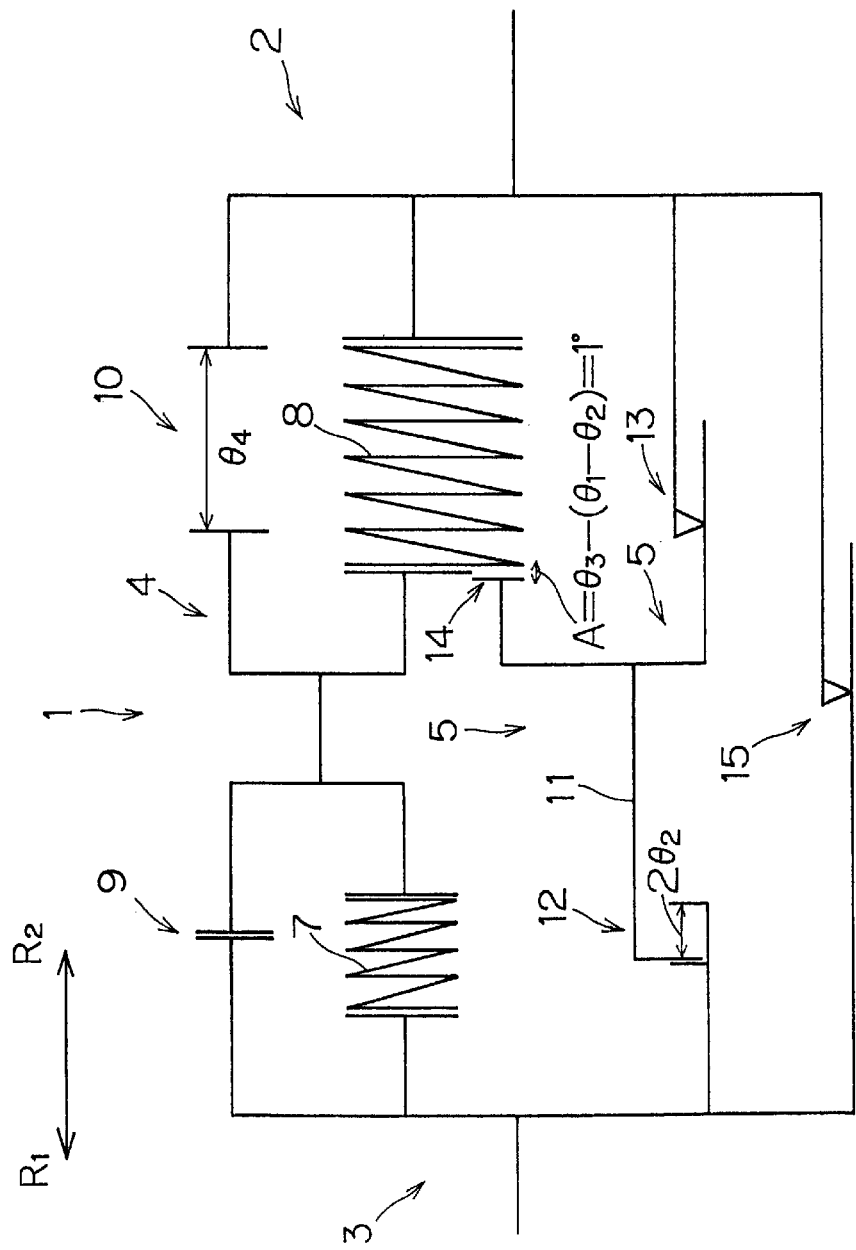
Figure 13:
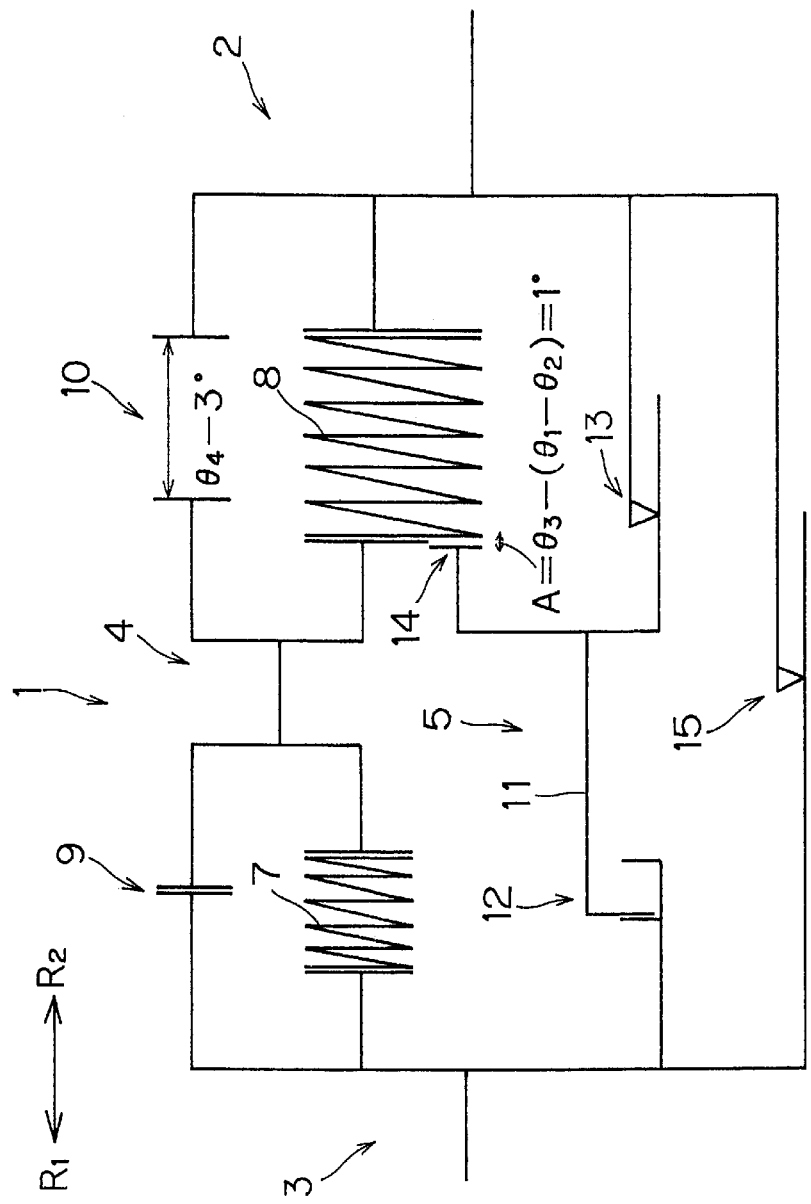
Figure 14:
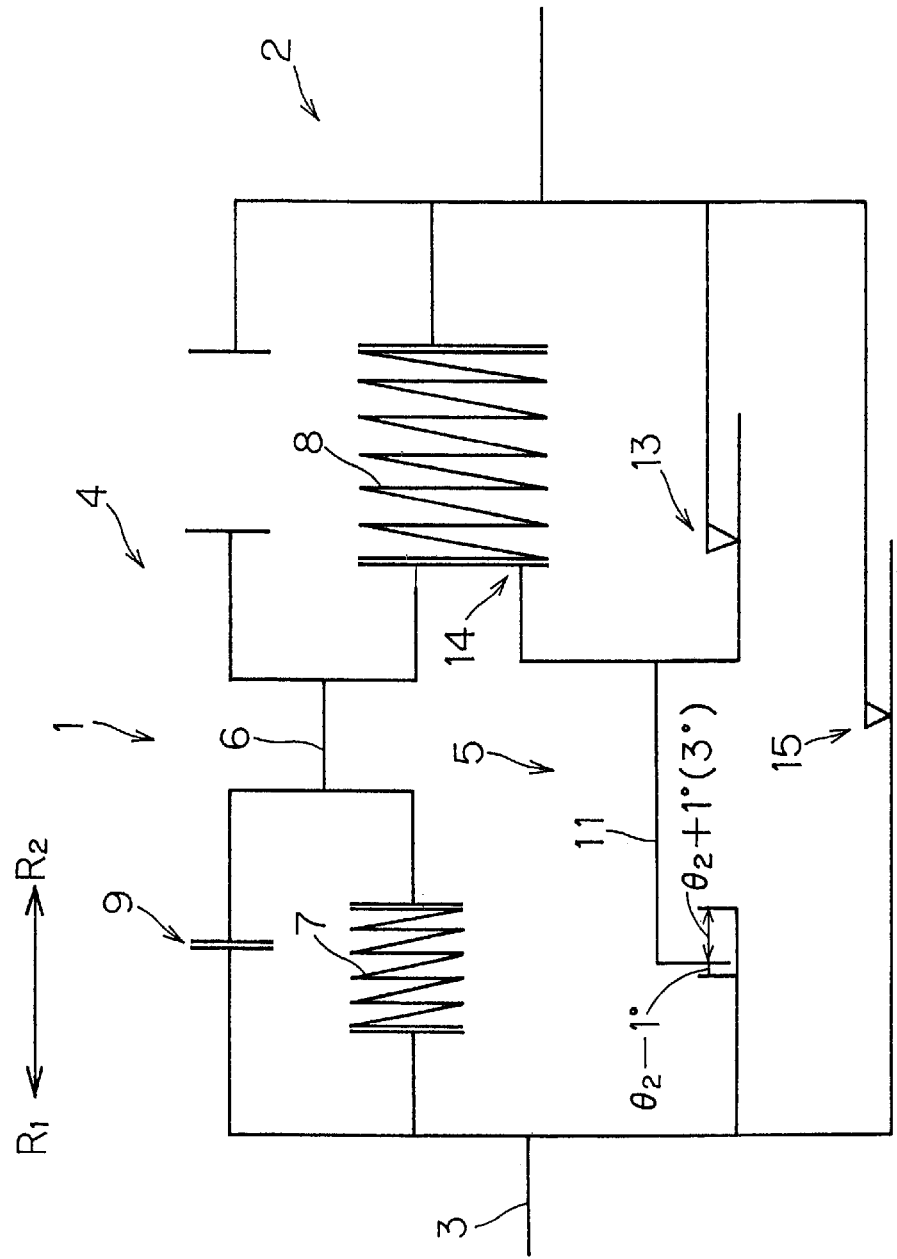
Figure 15:
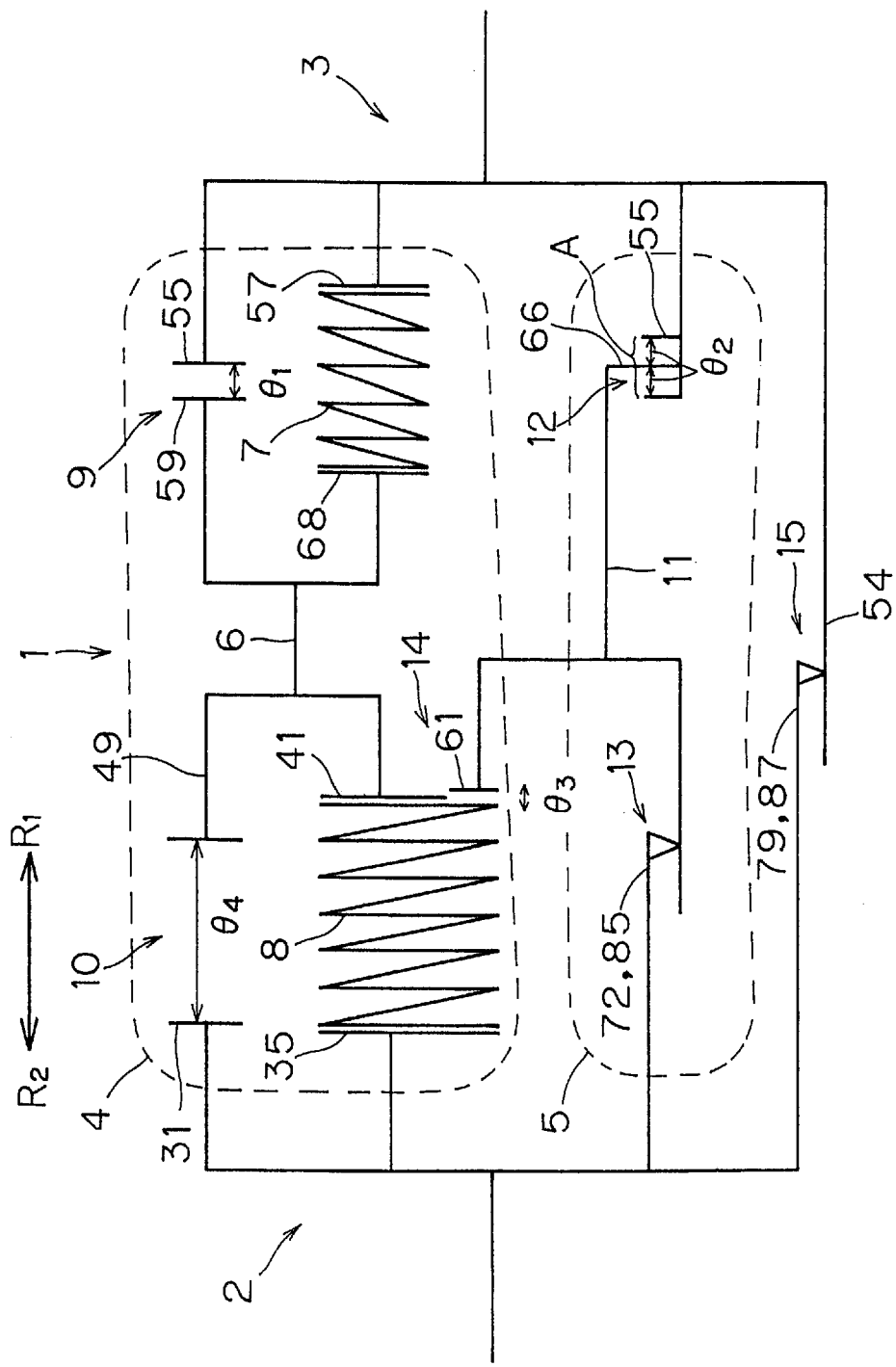
Figure 16:
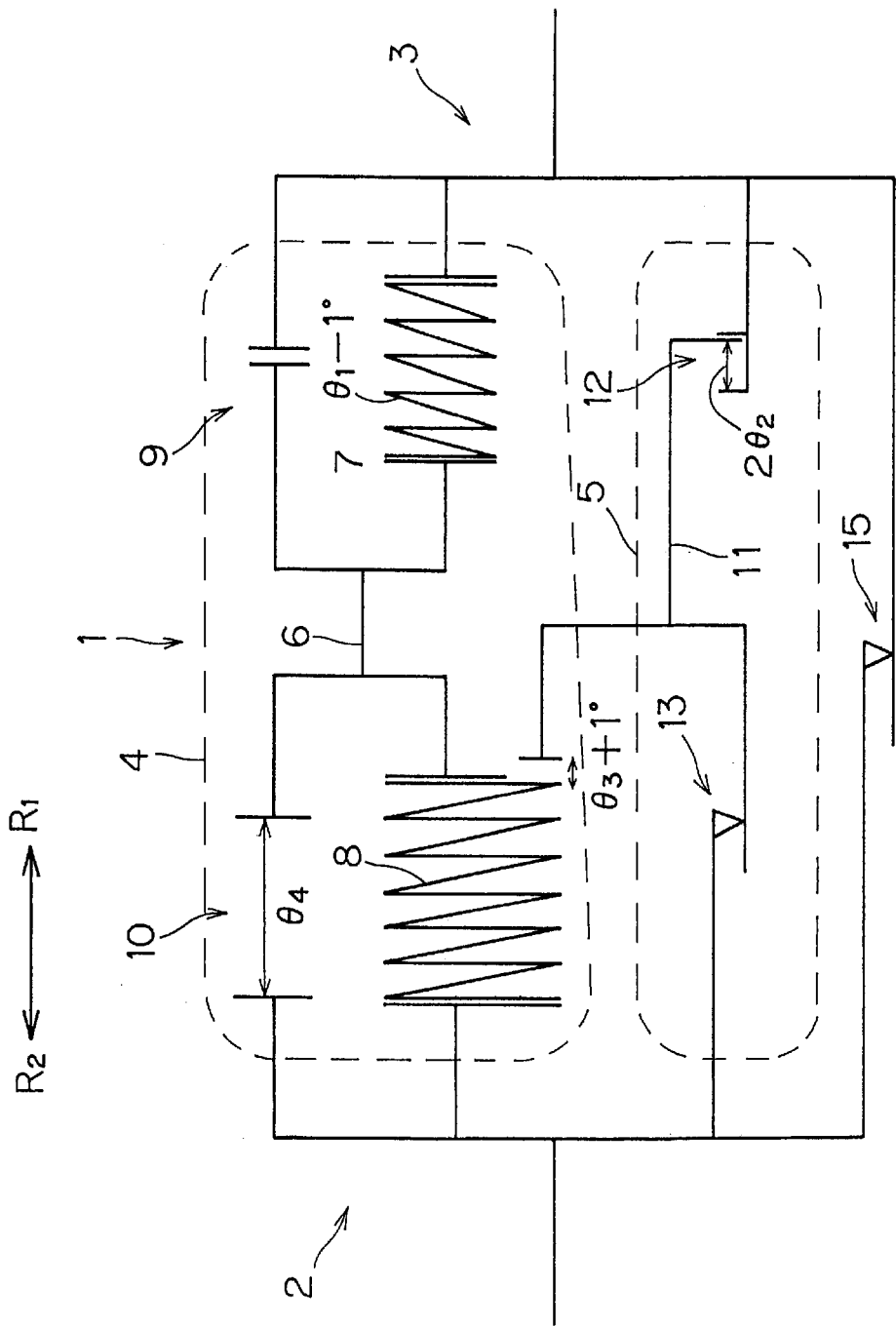
Figure 17:
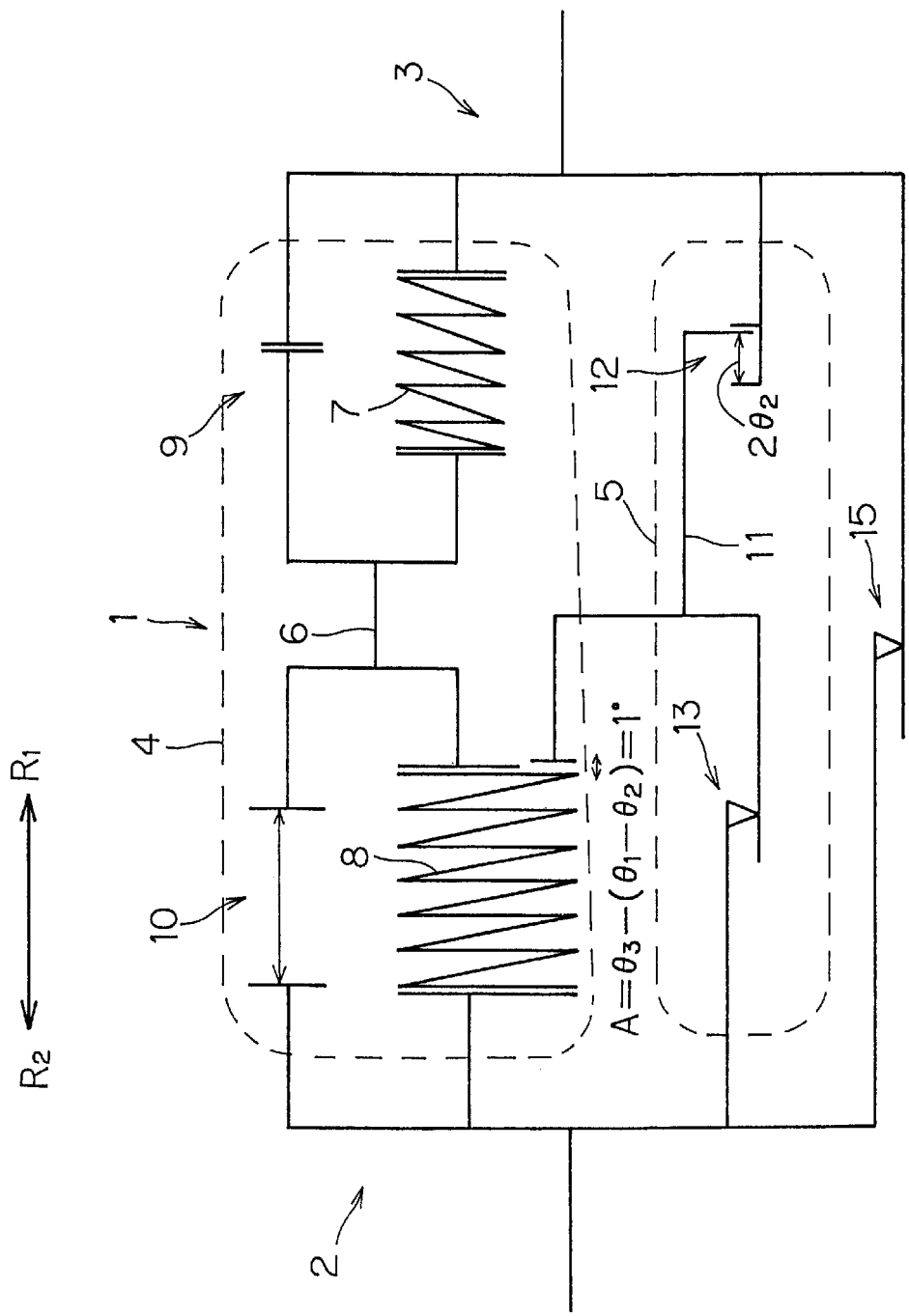
Figure 18:
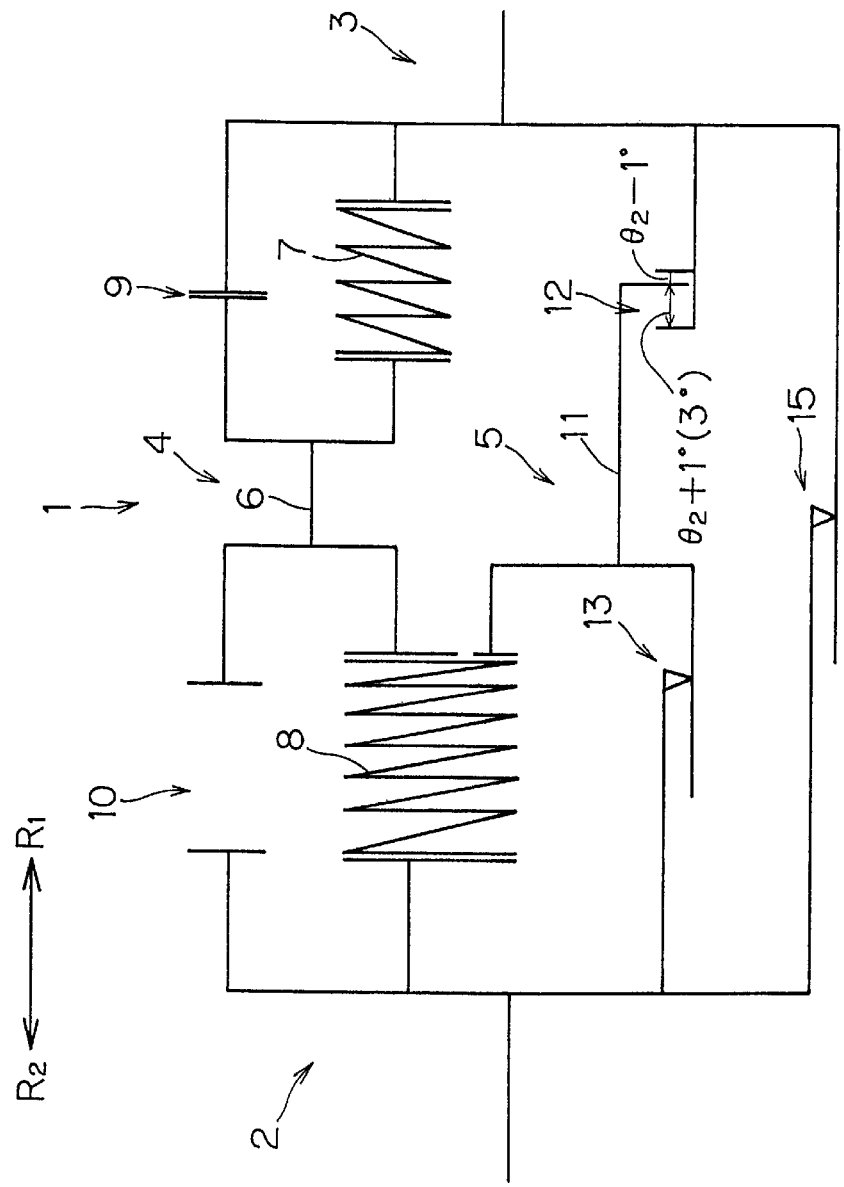

FIGS. 8 and 15 show states where the input and output rotary members 2 and 3 are standing still. These states are not depicted in torsional characteristic diagram of FIG. 19. FIGS. 9 to 14 show states where the output rotary member 3 is twisted from the zero-degree position toward the R2 side with respect to the input rotary member 2 (i.e., the input rotary member 2 is twisted from the zero-degree position toward the R1 side, i.e., positive side with respect to the output rotary member 3). FIGS. 9 to 13 show states where positive changes occur in the positive region, and FIG. 14 shows a state where a negative change occurs in the positive region. FIGS. 16 to 18 show states where the output rotary member 3 is twisted from the zero-degree position toward the R1 side (positive side) with respect to the input rotary member 2 (i.e., the input rotary member 2 is twisted from the zero-degree position toward the R2 side, i.e., negative side with respect to the output rotary member 3). FIGS. 16 and 17 show states where negative changes occur in the negative region, and FIG. 18 shows a state where a positive change occurs in the negative region.

Figure 9:
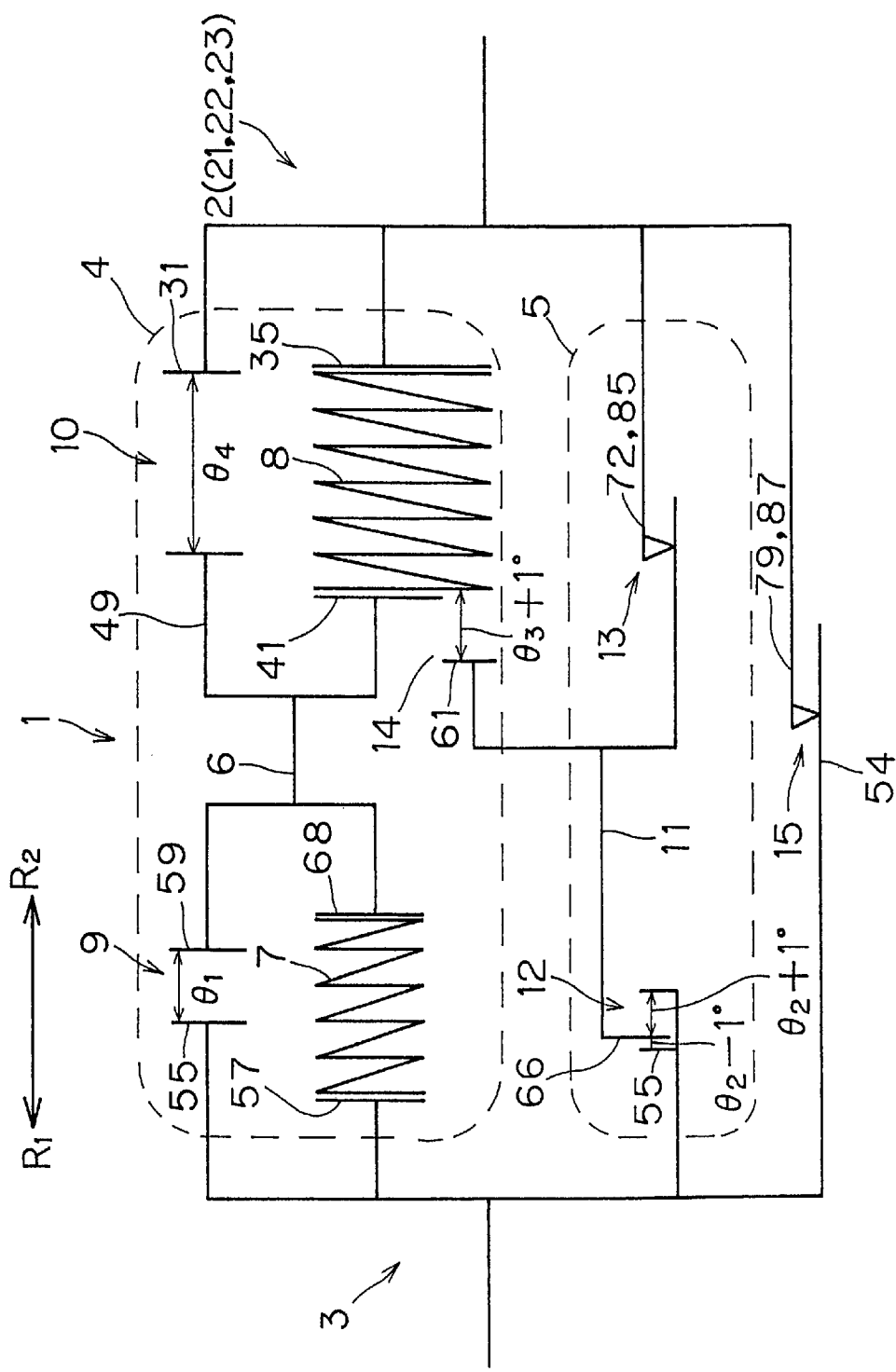
FIG. 9–18 are more mechanical circuit diagrams, each diagram showing a different operation state of the damper mechanism.
Figure 10:
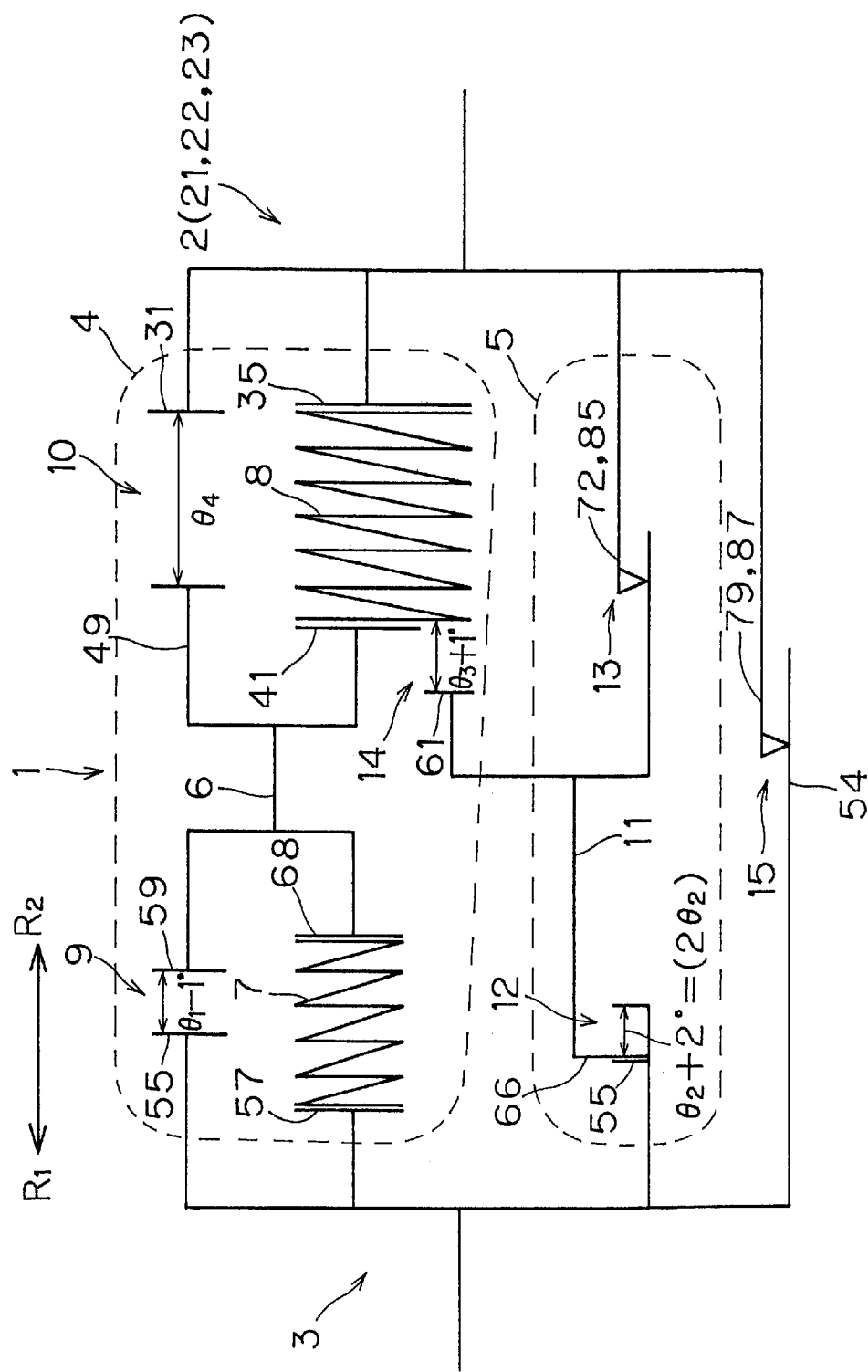
Figure 11:
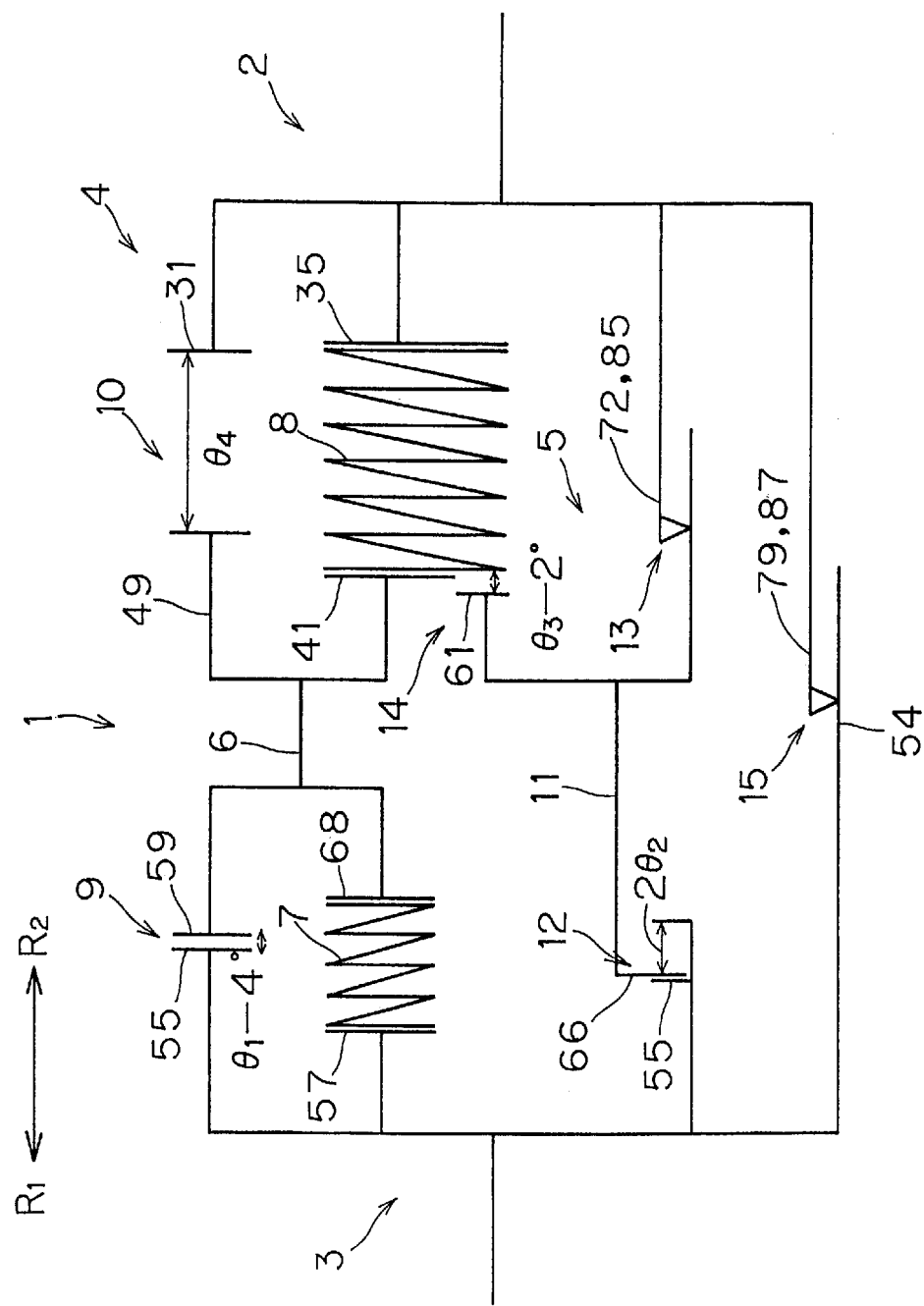

FIG. 9 shows the relationship at the time when twist occurs from the negative side to the positive side at 0 degree in the torsion characteristics. In this state, the intermediate plate 11 is shifted by 1 degree toward the output rotary member 3 (R1 side) from the position in the still state shown in FIG. 8. Therefore, a space of a sum (5 degrees) of the third torsion angle θ3 and 1 degree is formed between each engagement portion 61 of the intermediate plate 11 and the second spring 8. When the torsion angle goes to 1 degree, the output rotary member 3 is shifted by 1 degree with respect to the input rotary member 2 from the position shown in FIG. 9, and the output teeth 55 of the output rotary member 3 come into contact with the inner teeth 66 of the intermediate plate 11, as shown in FIG. 10. Thereafter, each first spring 7 is compressed between the output rotary member 3 and the separated flange 6 as shown in FIG. 11 while the torsion angle is between 1 and 5 degrees. Thereby, slide occurs in the friction mechanism 13. As a result, characteristics of a low rigidity and a high hysteresis torque are produced in the first stage range from 1 to 5 degrees. When the torsion angle goes to the first torsion angle θ1 (5 degrees) as shown in FIG. 12, the outer teeth 55 of the output rotary member 3 come into contact with the inner teeth 59 of the separated flange 6. As a result, each second spring 8 is compressed between the separated flange 6 and the input rotary member 2 in the second stage range from 5 degrees to the positive maximum allowable torsion angle θ4 (θE1), as shown in FIG. 13 (8 degrees). As a result, characteristics of a high rigidity and a high hysteresis torque are produced. In the state shown in FIG. 13, the space angle B (1 degree) is kept between each engagement portion 61 of the intermediate plate 11 and the end of the second spring 8. This space angle B is equal to a value obtained by subtracting the third torsion angle θ3 (4 degrees) from a difference between the first torsion angle θ1 (5 degrees) in the still state shown in FIG. 8 and the second torsion angle θ2 (2 degrees).

When the torsion angle returns toward the negative side after reaching the maximum value, the second spring 8 in the compressed state shown in FIG. 13 expands and pushes the separated flange 6 so that the end of the second spring 8 comes into contact with the engagement portion 61 of the intermediate plate 11 as shown in FIG. 14. No slide occurs in the friction mechanism 13 in the range of 1 degree before the end of the second spring 8 comes into contact with the engagement portion 61.

The second spring 8 pushes the separated flange 6 as well as the intermediate plate 11. Therefore, the intermediate plate 11 keeps the position shifted by 1 degree toward the R1 side from the output rotary member 3.

When the torsion angle reaches 5 degrees, the second spring 8 attains the free state, and then each first spring 7 starts to expand. At this time, the intermediate plate 11 is shifted by 1 degree toward the R1 side with respect to the output rotary member 3, as shown in FIG. 14, so that characteristics of a low rigidity and a low hysteresis torque are obtained in a range from start of expansion of the first spring 7 to arrival of the output rotary member 3 at the position shifted by (θ2+1 deg.=3 deg.) with respect to the intermediate plate 11. Thus, no slide occurs in the friction mechanism 13 in a range from 5 degrees to 2 degrees. When the torsion angle reaches 2 degrees, the output rotary member 3 starts to move the intermediate plate 11 toward the R1 side so that the intermediate plate 11 is spaced from the end of the second spring 8 as shown in FIG. 16, and slide occurs in the friction mechanism 13. As a result, characteristics of a low rigidity and a high hysteresis torque are produced in the first stage range from 2 degrees to −2 degrees. When the torsion angle enters a range lower than 0 degrees, the first spring 7 is compressed between the output rotary member 3 and the separated flange 6 as shown in FIG. 16. When the torsion angle exceeds −2 degrees, the second stop 9 comes into contact and the second spring 8 is compressed between the separated flange 6 and the input rotary member 2. The opposite side of the first stop 9 comes into contact, and thereafter the second spring 8 is compressed between the intermediate plate 11 and the input rotary member 2. As a result, characteristics of a high rigidity and a high hysteresis torque are produced in the negative second stage. When the state returns from the negatively twisted state in the second stage toward the positively twisted state, the second spring 8 urges the separated flange 6 and the intermediate plate 11 as shown in FIG. 18. In this operation, the friction mechanism 13 causes slide and thereby generates a high hysteresis torque. In this return state, the intermediate plate 11 is in the position shifted by 1 degree toward the R1 side with respect to the output rotary member 3. When the torsion angle reaches −2 degrees, the second spring 8 stops expansion, and the first spring 7 starts expanding. In a range of 3 degrees (i.e., θ2+1 deg.) from −2 degrees to 1 degree, the first spring 7 pushes the output rotary member 3, but the intermediate plate 11 does not slide with respect to the input rotary member 2 so that a high hysteresis torque is not produced.

Then, description is specifically given on changes in torsion characteristic which occur when vibrations are supplied to the clutch disk assembly 1.

Figure 19:
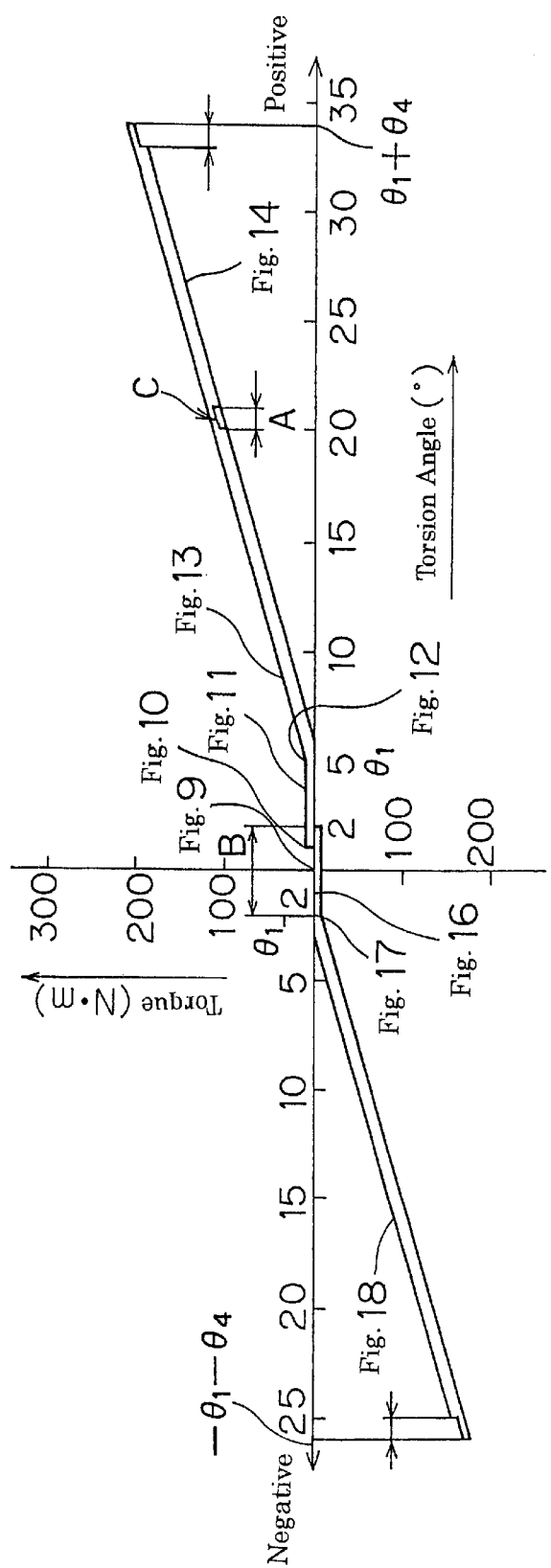
FIG. 19 is a graph showing torsion characteristics of the clutch disk assembly, specific portions of the graph corresponding to the operational states of the damper mechanism represented in FIGS. 9–18.

When torsional vibrations of a large amplitude such as longitudinal vibrations of a vehicle occur, the torsion angle repetitively changes in and between the positive and negative second stages of the characteristics shown in FIG. 19. In this operation, a high hysteresis torque occurs in both the first and second stages so that longitudinal vibrations of the vehicle are rapidly damped.

Then, it is assumed that the clutch disk assembly 1 is supplied with minute torsional vibrations caused, e.g., by combustion variations in the engine during normal driving (e.g., in the positive second stage range shown in FIG. 13). In this state, the output and input rotary members 3 and 2 can rotate relatively to each other through a range of the space angle A of 1 degree equal to (v3−(θ1−θ2)) without operating the friction mechanism 13. Thus, in the range of the space angle A (friction suppressing mechanism) shown at C in FIG. 19, the second spring 8 operates, but slide does not occur in the friction mechanism 13. As a result, minute torsional vibrations, which may cause rattle and muffled noises during driving, can be effectively absorbed.

Description is now be given on the operation in the case where minute vibrations such as idling vibrations are supplied to the clutch disk assembly 1. In this case, the damper mechanism operates in the positive and negative first ranges (from −2 to 5 degrees, e.g., FIGS. 9, 10 and 11). When minute torsional vibrations are supplied, e.g., in the state shown in FIG. 9, the output rotary member 3 rotates relatively to the separated flange 6, intermediate plate 11 and input rotary member 2. In this operation, the first springs 7 operate, and no slide occurs in the friction mechanism 13. The magnitude of the torsion angle of the damper mechanism in this operation is not larger than the total space angle B (4 degrees) in the third stop 12.

The low rigidity and low hysteresis torque achieved in the first stage range improve the standing gear noise level. Although the low rigidity and low hysteresis torque achieved to a higher extent in the first range may cause a jumping or jerking phenomenon, the jumping phenomenon is suppressed in the clutch disk assembly 1 by provision of the regions of a high hysteresis torque in the opposite sides of the first stage range (first region). The above jumping phenomenon is a phenomenon in which vibrations rebound from walls of both the positive and negative second stages and develop into vibrations over the entire first range so that noises at a higher level than a standing gear noise level occur.

As described above, the friction mechanism 13 frictionally engages the input and output rotary members 2 and 3 with each other in the rotating direction, and can cause sliding in the first and second stage ranges. The space of the second torsion angle θ2 in the third stop 12 and the space of the third torsion angle θ3 in the fourth stop 14 function as friction suppressing means for preventing sliding in the friction mechanism 13 which may be caused by torsional vibrations of a predetermined torque or less in the first and second stage ranges. Further, the whole second damper mechanism 5 can be considered as a friction mechanism, which does not cause internal sliding when supplied with torsional vibrations not larger than the predetermined torque in the first and second ranges, but causes internal sliding to produce friction when supplied with torsional vibrations larger than the predetermined torque. The third stop 12 can be considered as a first friction suppressing mechanism which suppresses sliding in the friction mechanism 13 when supplied with torsional vibrations not larger than the predetermined torque in the first stage range. The fourth stop 14 can be considered as a second friction suppressing mechanism which suppresses sliding in the friction mechanism 13 when supplied with torsional vibration not larger than the predetermined torque in the second stage range.

In the clutch disk assembly 1, the second stage range of the torsion angle is increased by employing the plate-like coupling portions 31 instead of conventional stop pins, whereby the resonance point of the engine rotation speed shifts toward the lower side. Further, the high hysteresis torque can reduce a peak of the resonance point.

Moreover, the rattle and muffled noises during driving can be reduced by employing the structure, which does not produce a high hysteresis torque in response to minute torsional vibrations, in addition to the structure achieving the low rigidity in the second stage range of the torsion angle.

Combination of a structure achieving the low rigidity in the second region of the torsion characteristics and a structure of generating the low hysteresis torque in response to minute vibrations in the second region of the torsion characteristics is possible.

In the clutch disk assembly 1 described above, employment of the plate-like coupling portion 31 can significantly increase the entire torsion angle, and particularly can significantly increase the torsion angle of the second region compared with the prior art. This maximum torsion angle is preferably 20 degrees or more, more preferably 30 degrees or more, and further preferably 40 degrees or more. In this embodiment, the allowed maximum torsion angle equal to the sum of those in the positive and negative directions is about 60 degrees. The allowed maximum torsion angle in the positive direction is about 35 degrees, and the allowed maximum torsion angle in the negative direction is about 25 degrees. Further, the angle of 30 degrees or more is ensured in the positive second region. By ensuring the larger maximum torsion angle than the prior art, the torsional rigidity in the second region is significantly reduced. In addition, the torsional rigidity can be reduced in proportion to the torsion angle in the structure having the stop torque substantially equal to that in the prior art. The stop torque is in a range from 18.4 to 21.0 kgfm. The torsional rigidity is equal to 0.71 kgfm/deg, and is preferably in a range from 0.6 to 0.8 kgfm/deg. The torsional rigidity not exceeding 1.5 kgfm/deg achieves an unprecedented effect, and the rigidity not exceeding 1.0 kgfm/deg is further preferable.

The low rigidity is achieved by increasing the maximum torsion angle in the second stage of the torsion characteristics as described above, and this low rigidity achieves the following effects. First, the structure can reduce an upward shock which may occur during transition from the first stage to the second stage. This shock is a first shock applied to a driver when depressing an accelerator. Secondary, the torsional resonance frequency can be set below the service speed range of the engine owing to the reduced rigidity. As a result, the gear noises and muffled noises of the drive system are reduced during driving.

According to the invention, the hysteresis torque (represented by the letter A in FIG. 19), which occurs when the mechanism receives minute torsional vibrations in the second region, is much smaller than hysteresis torque generated in a second range in prior art damper mechanisms.

Specifically, in the second region, due to lack of contact between the spring 8 and the engagement portion 61, the friction mechanism 13 does not operate in the second region when there are small vibrations, and therefore, only the friction mechanism 15 operates (range represented by letter A in FIG. 19). For larger vibrations, contact between the engagement portion 61 occurs and the friction mechanism 13 operates with the friction mechanism 15.

For example, in the present invention the hysteresis torque in the range A (FIG. 19) in the disclosed embodiment is 0.06 kgfm. This hysteresis torque is preferably in a range from 0.04 to 0.08 kgfm. The hysteresis torque not exceeding 0.20 kgfm is an unprecedented effect not found in the prior art, and is further preferably equal to or lower than 0.10 kgfm. This hysteresis torque is 0.04 times as large as the hysteresis torque which occurs when the torque in the second region of the torsion characteristics is large and the vibrations of a large torsion angle are supplied (when both friction mechanisms 13 and 15 operate). The ratio is preferably 0.15 or less, and more preferably 0.10 or less. If this ratio is in a range from 0.03 to 0.05, the best effect can be achieved. As described above, the hysteresis torque caused by the minute torsional vibrations is sufficiently reduced. This structure exhibiting such a reduced hysteresis torque cooperates with the foregoing structure exhibiting the low rigidity in the second region to provide the superior characteristics of the low rigidity and low hysteresis torque with respect to the minute torsional vibrations. As a result, the gear noises and muffled noises of the drive system during normal driving are significantly reduced as compared with the prior art.

According to the damper mechanism of the invention, the allowed maximum torsion angle is increased, and thereby the torsional rigidity in the second region of the torsion characteristics can be significantly reduced. In addition, the hysteresis torque which occurs in response to the torsional vibrations not exceeding the predetermined torque in the second region of the torsion characteristics can be smaller than that in the prior art. The combination of the low torsional rigidity and the low hysteresis torque described above can significantly reduce the gear noises and muffled noises of the drive system during driving.

What is claimed is:

1. A damper mechanism comprising:
   a first rotary plate formed with a window;
   a second rotary plate coaxially aligned with said first rotary plate, said second rotary plate being disposed on a first axial side of said first rotary plate, said second rotary plate having a first support adjacent to said window with the damper mechanism in a torsion free state;
   a third rotary plate coaxially aligned with said first and second rotary plates, said third rotary plate being disposed on a second axial side of said first rotary plate, said third rotary plate having a second support adjacent to said window;
   a plate-like coupling portion extending in an axial direction between outer peripheral portions of said second and third rotary plates fixing said second and third rotary plates together, said coupling portion having a main surface facing in a radially outward direction relative to the damper mechanism;
   a first elastic member disposed inside said window and between said first and second supports for elastically and circumferentially coupling said first rotary plate to said second and third rotary plates, said first elastic member being compressed between said window and said first and second supports in response to relative rotary displacement between said first rotary plate and said second and third rotary plates;
   a hub disposed co-axially with respect to said first, second and third rotary plates in a radially inward portion of said first rotary plate;
   a second elastic member elastically and circumferentially coupling said first rotary plate to said hub, said second elastic member having a rigidity lower than a rigidity of said first elastic member;
   a friction mechanism disposed in the damper mechanism arranged to generate frictional resistance in response to compression of said first elastic member in a predetermined region of relative rotary displacement within the damper mechanism; and
   a friction generation suppression mechanism having a rotational gap preventing operation of said friction mechanism during input of a small angle vibration in a rang in which said first elastic member is compressed;
   said first rotary plate being provided at an outer periphery thereof with a stop portion arranged to contact said plate-like coupling portion in response to relative rotary displacement between said first rotary plate member and said second and third rotary plate members.

2. The damper mechanism according to claim 1, wherein said plate-like coupling portion is located radially outward from said window.

3. damper mechanism according to claim 1,
   wherein a maximum rotary displacement angle between said first and second rotary members is at least 20 degrees.

4. The damper mechanism according to claim 3, wherein said maximum rotary displacement angle between said first and second rotary members is at least 30°.

5. The damper mechanism according to claim 3, wherein
   said maximum rotary displacement angle between said first and second rotary members is at least 40°.

6. The damper mechanism according to claim 1, said first and second elastic members forming a damper mechanism arranged to exhibit torsion dampening characteristics within a first region and a second region of angular displacement between said first and second rotary members, said damper mechanism exhibiting a greater degree of rigidity in said second region than in said first region; wherein
   said damper mechanism exhibits a torsional rigidity in said second region of no more than 1.5 kgfm/deg (1.5 kilograms of force•meter per degree).

7. The damper mechanism according to claim 6, wherein
   said torsional rigidity in said second region of the torsion characteristics is less than 1.0 kgfm/deg.

8. The damper mechanism according to claim 7, wherein
   said torsional rigidity in said second region is in a range from 0.6 kgfm/deg to 0.8 kgfm/deg.

9. The damper mechanism according to claim 8, wherein said friction mechanism and said friction suppression mechanism are arranged such that:
   a first level of hysteresis torque is generated in response to small vibrations that cause relative rotary displacement within said predetermined angular displacement range within said second region, and a second level of hysteresis torque is generated in response to vibrations that cause relative rotary displacement greater than said predetermined angular displacement range within said second range, said first level of hysteresis torque is smaller than said second level of hysteresis torque, such that ratio of the first level to second level is no more than 0.15.

10. The damper mechanism according to claim 9, wherein said ratio of (first level)/(second level) is no more than 0.10.

11. The damper mechanism according to claim 10, wherein said ratio of (first level)/(second level) is in a range from 0.03 to 0.05.

12. The damper mechanism according to claim 9, wherein said first level of hysteresis torque has a magnitude of no more than 0.20 kgfm.

13. The damper mechanism according to claim 12, wherein said first level of hysteresis torque is no more than 0.10 kgfm.

14. The damper mechanism according to claim 13, wherein said first level of hysteresis torque is in a range of from about 0.04 kgfm to about 0.08 kgfm.

* * * * *